United States Patent [19]
Aberschitz et al.

[11] Patent Number: 6,154,693
[45] Date of Patent: Nov. 28, 2000

[54] AUTOMATIC AIRCRAFT LANDING

[75] Inventors: Abraham Aberschitz, Netanya; Michael Livschitz, Jerusalem; Uri Soudak, Herzlia, all of Israel

[73] Assignee: Israel Aircraft Industries Ltd., Israel

[21] Appl. No.: 09/068,687

[22] PCT Filed: Nov. 12, 1996

[86] PCT No.: PCT/IL96/00146

§ 371 Date: May 14, 1998

§ 102(e) Date: May 14, 1998

[87] PCT Pub. No.: WO97/18484

PCT Pub. Date: May 22, 1997

[30] Foreign Application Priority Data

Nov. 14, 1995 [IL] Israel ........................................ 115977

[51] Int. Cl.[7] .................................................. G06F 19/00
[52] U.S. Cl. ............................... 701/16; 701/23; 701/27; 701/120; 701/121; 701/122
[58] Field of Search ..................... 701/120, 121, 701/122, 4, 23, 27, 14, 15, 16; 340/26

[56] References Cited

U.S. PATENT DOCUMENTS

| | | | |
|---|---|---|---|
| 3,927,306 | 12/1975 | Miller | 235/150.22 |
| 4,354,237 | 10/1982 | Lambregts et al. | 364/428 |
| 4,357,661 | 11/1982 | Lambregts et al. | 364/430 |
| 5,020,747 | 6/1991 | Orgun et al. | 244/187 |
| 5,235,513 | 8/1993 | Velger et al. | 364/449 |
| 5,475,393 | 12/1995 | Heinzerling | 342/410 |
| 5,661,486 | 8/1997 | Fraivre et al. | 342/33 |

FOREIGN PATENT DOCUMENTS 2 224 613  5/1990  United Kingdom .
2 246 261  1/1992  United Kingdom .

OTHER PUBLICATIONS

Abstract of Japanese Patent No. 05–16894, published Jan. 26, 1993.
Abstract of Japanese Patent No. 08–108899, publsihed Apr. 30, 1996.
Abstract of Japanese Patent No. 05–039094, published Feb. 19, 1993.
Larkin, Lawrence , "A fuzzy logic controller for aircraft flight control.", Industrial application of Fuzzy Control, Elsecier Science Publishers, Holland, pp. 87–103 (1985).
Steinberg, Marc., "Development and stimulation of an F/A–18 fuzzy automatic carrier landing system." Naval Air Warfare Center, Aircraft Division, PA, pp. 797–802 (1993).
Steinberg, Marc., "A Fuzzy Logic based F/A–18 automatic carrier landing system." Naval Air Warfare Center, Aircraft Division, PA, pp. 797–802 (1993).

Primary Examiner—William A. Cuchlinski, Jr.
Assistant Examiner—Marthe Marc-Coleman
Attorney, Agent, or Firm—Browdy and Neimark

[57] ABSTRACT

An automatic aircraft landing system (AALS) (10) for automatically landing an aircraft on a runway. The AALS (10) includes data acquisition apparatus (DAA) (24) for acquiring flight data pertaining to the descent of an aircraft along a flight path (26) defined between a final capture point (16) and a touchdown point on the runway. The AALS (10) also includes a fuzzy logic controller (FLC) (20) responsive to the flight data for providing control signals according to at least one set of flight guidelines to at least one of the aircraft's primary controls for at least urging the aircraft to essentially adhere to a guide path (28) along at least a portion of its flight path.

20 Claims, 19 Drawing Sheets

| Z \ D_Z | BIG_NEG | MIDD_NEG | SMALL_N | ZERO | SMALL_P | MIDD_POS | BIG_POS | STALL_BG |
|---|---|---|---|---|---|---|---|---|
| BIG_UP | MN | MN | MN | SN | Z | SP | SP | |
| MIDD_UP | MN | MN | SN | SN / Z | Z | SP | SP | |
| SMALL_UP | MN | MN | SN | Z | Z | SP | MP | |
| ZERO | MN | SN | SN / Z | Z | Z / SP | SP | MP | |
| SMALL_DW | MN | SN | Z | Z | SP | SP / MP | MP | |
| MIDD_DW | MN | SN | Z | Z / SP | SP | MP | MP | |
| BIG_DW | SN | SN | Z | SP | SP | MP | MP | |

| | Z | D_Z | HEIGHT | | D_TRK_EL |
|---|---|---|---|---|---|
| IF: | BIG_UP<br>MIDD_UP<br>SMALL_UP<br>ZERO<br>SMALL_DW<br>MIDD_DW<br>BIG_DW | BIG_NEG<br>MIDD_NEG<br>SMALL_N<br>ZERO<br>SMALL_P<br>MIDD_POS<br>BIG_POS<br>STALL_BG | TOUCH_DN<br>HT_FLARE<br>UP_FLARE<br>PREFLARE<br>•GLIDE | THEN: | BIG_NEG<br>MIDDLE_N<br>SMALL_N<br>ZERO<br>SMALL_P<br>MIDDLE_P<br>BIG_POS |
| MIN | | | | PROD | |

FIG. 13

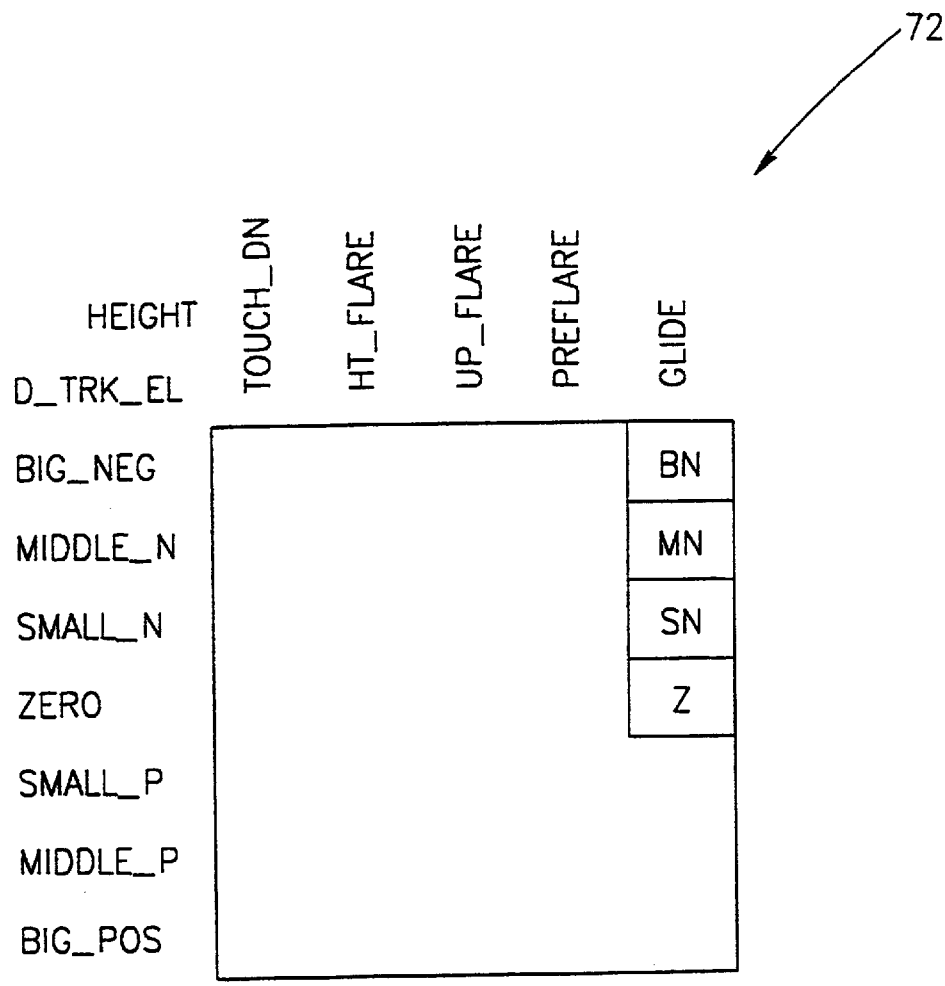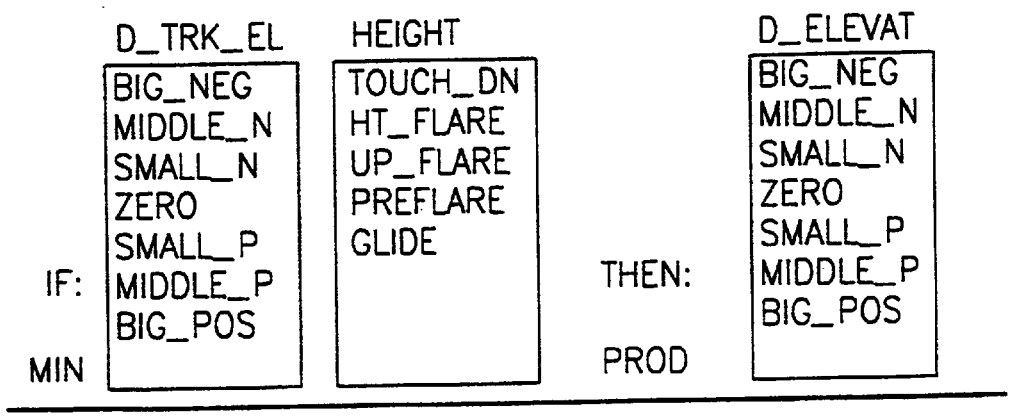
FIG.16

|  | TAKE_OFF | LANDING | HT_FLARE | UP_FLARE | GLIDE |
|---|---|---|---|---|---|
| D_HEIGHT HEIGHT | | | | | |
| TOUCH_DN | Z / SN/2 | Z | SP / MP | MP | BP |
| HT_FLARE | Z / SN/2 | Z | 0.5Z / SP | SP / MP | BP |
| UP_FLARE | Z / SN/2 | Z | Z | SP | MP |
| PREFLARE | | | | | |
| GLIDE | | | | | |

74

| D_ELEVAT<br>ELEV_FL | BIG_NEG | MIDDLE_N | SMALL_N | ZERO | SMALL_P | MIDDLE_P | BIG_POS |
|---|---|---|---|---|---|---|---|
| NEGATIVE | NEG | NEG | NEG | NEG | NEG<br>Z/3 | NEG<br>Z/2 | Z |
| ZERO | NEG | NEG<br>Z/2 | NEG/2<br>Z | Z | Z<br>SM/3 | Z<br>SM/2 | SM |
| SMALL_P | Z | Z<br>SM/2 | Z/2<br>SM | SM | SM<br>NSM/3 | SM<br>NSM/2 | NSM |
| NOTSMALL | SM | SM<br>NSM/2 | SM/2<br>NSM | NSM | NSM<br>MD/3 | NSM<br>MD/2 | MD |
| MIDDLE | NSM | NSM<br>MD/2 | NSM/2<br>MD | MD | MD<br>NBG/3 | MD<br>NBG/2 | NBG |
| NOT_BIG | MD | MD<br>NBG/2 | MD/2<br>NBG | NBG | NGB<br>BP/3 | NGB<br>BP/2 | BP |
| BIG | NBG | NGB<br>BP/2 | NBG/2<br>BP | BP | BP<br>VB/3 | BP<br>VB/2 | VB |
| VERY_BIG | BP | BP<br>VB/2 | BP/2<br>VB | VB | VB<br>FL/3 | VB<br>FL/2 | FL |
| FLARE_BG | VB | VB<br>FL/2 | VB/2<br>FL | FL | FL | FL | FL |

76

IF: D_ELEVAT
BIG_NEG
MIDDLE_N
SMALL_N
ZERO
SMALL_P
MIDDLE_P
BIG_POS
MIN

ELEV_FL
NEGATIVE
ZERO
SMALL_P
NOTSMALL
MIDDLE
NOT_BIG
BIG
VERY_BIG
FLARE_BG

THEN:
PROD

ELEV_SUM
NEGATIVE
ZERO
SMALL_P
NOTSMALL
MIDDLE
NOT_BIG
BIG_POS
VERY_BIG
FLARE_BG

FIG.18

AUTOMATIC AIRCRAFT LANDING

FIELD OF THE INVENTION

The present invention relates to aircraft flight control in general and to automatic aircraft landing in particular.

BACKGROUND OF THE INVENTION

The sophistication of unmanned air vehicles (UAVs) ranges from simple almost model aircraft like UAVs to highly sophisticated UAVs equipped with on-board instrumentation such as an altimeter, up to three gyroscopes, up to three accelerometers, and the like. Irrespective of its sophistication, control over a UAV's primary flight controls, namely, its elevators, flaps, ailerons, rudder and throttle is by means of radio signals.

Initial control over a UAV is in the hands of a control station operator. For landing a UAV, control thereover is transferred to a ground operator who is typically situated adjacent to the runway on which the UAV is to be landed. Transfer of control over the UAV occurs when it can be seen by the ground operator, it has an air speed of about 40–60 knots and a "sink rate" of about 2.2 ms$^{-1}$ and it is located at a distance of between about 600 m and about 1000 m from the runway's front edge and at an altitude between about 50 m and about 100 m.

At the ground operator's disposal is a control box similar to a model aircraft's control box in that it has a left stick for respectively controlling a UAV's throttle and rudder by up/down and left/right movements and a right stick for respectively controlling its elevators and ailerons by up/down and left/right movements. In addition, the control box has a four position switch for controlling the position of a UAV's flaps.

On transfer of control, the ground operator sets the four position switch to a landing position and then relies on his judgement and intuition to handle a UAV by means of the two control sticks to land it safely on the runway. In case a ground operator senses that he cannot land a UAV safely, he aborts a landing attempt. It is well known that even a proficient ground operator can often require several attempts to land a UAV safely due to lack of the "feel" of the UAV's responses to his commands, the affects of wind gusts, and the like.

In GB-A-2 224 613, there is described an automatic aircraft landing system and a corresponding method for automatically landing an aircraft on a runway. The system includes data acquisition apparatus for acquiring flight data pertaining to the descent of an aircraft on a flight path defined between a final capture point and a touchdown point on a runway and a controller responsive to the flight data for providing control signals to at least one of the aircraft's primary controls for urging the aircraft to essentially adhere to a guide path along at least an upper portion of its flight path.

In Patent Abstracts of Japan, vol. 17, no. 330 (M-1434), 23.06.93 and JP-A-05 039094, 19.02.93, there is described a fuzzy logic based landing control device for automatically landing a helicopter after its engine is stopped in flight and the helicopter is in its autorotation state.

Glossary of Terms

The following are the meaning of some of the terms used in the specification and the claims appended thereto:

"final capture zone"—an ellipsoid shaped zone within which control over an aircraft passes to an automatic aircraft landing system (AALS) for automatically landing the aircraft on the runway. Control is only passed to the AALS when an aircraft's flight velocity lies within an acceptable range. The size of a final capture zone, its position relative to a runway and an acceptable range of flight velocities are dependent on the aircraft to be landed and on prevailing flight conditions.

"final capture point"—the point of transfer of control over an aircraft to an AALS.

"flight path"—the actual travel path of an aircraft from a final capture point to a touchdown point on a runway.

"fight region"—a flight region defines a range of altitudes for which a particular set of flight guidelines apply.

"flight data"—flight details such as altitude, sink rate, horizontal deviation from a runway's midline.

"set of flight guidelines"—a set of instructions which produce control signals in response to flight data.

"guide path"—an imaginary path employed by the AALS for landing an aircraft on a runway.

SUMMARY OF THE INVENTION

The object of the invention is to provide for automatic aircraft landing.

In accordance with a broad aspect of the invention, there is provided an automatic aircraft landing system (AALS) for automatically landing an aircraft on a runway, the system comprising:

(a) data acquisition apparatus (DAA) for acquiring flight data pertaining to the descent of an aircraft along a flight path defined between a final capture point and a touchdown point on the runway; and (b) a fuzzy logic controller (FLC) responsive to the flight data for providing control signals according to at least one set of flight guidelines to at least one of the aircraft's primary controls for at least urging the aircraft to essentially adhere to a guide path along at least a portion of its flight path.

On transfer of control over an aircraft during a landing approach to an AALS, the AALS's FLC provides control signals for controlling the aircraft's primary flight controls for urging it to essentially adhere to a guide path along at least some of its flight path defined between its final capture point and its eventual touchdown point on the runway. In most likelihood, a flight path will not coincide with a guide path whilst, in certain cases, certain control signals may even have the temporary effect of distancing an aircraft from an already established guide path.

A guide path along with the set(s) of flight guidelines generates an envelop in which the descent of an aircraft can be adaptively adjusted for a safe landing on a runway. Although, the envelop has no rigid boundaries as such, an experienced operator would recognize when an aircraft has strayed too far for a successful landing to be possible in which case he would then have to act to commandeer control over the aircraft prior to another attempt at an automatic landing.

In the preferred embodiment of the invention, the FLC applies different sets of flight guidelines during three consecutive flight regions extending downwards from an aircraft's final capture point to its touchdown point on a runway. In accordance with the inherent nature of fuzzy logic as described briefly hereinbelow, adjacent flight regions overlap at their common extremities. The purpose of this overlapping is to enable a smooth transition during the application of different sets of flight guidelines.

Depending on the flight region, some of the flight guidelines relate to the deviation between an aircraft's instantaneous position and a preferred position whilst others relate to an aircraft's sink rate whilst still others relate to the instantaneous position of an aircraft's primary controls with respect to a desired state. Many of the flight guidelines can be expressed in more than one manner using different parameters by suitable substitutions and conventional mathematical techniques such as integration.

In the case of landing a UAV, FLC-issued control signals are preferably transmitted by a ground transmitter which was hitherto connected to a conventional model aircraft like control box whilst a DAA preferably includes passive devices for remote manual tracking by a ground operator. Alternatively, a DAA can incorporate on-board instrumentation and therefore be included on-board an aircraft as can a FLC.

There is also provided according lo a second aspect of the invention, an automatic aircraft landing method for automatically landing an aircraft on a runway, the method comprising the steps of:

(a) capturing an aircraft at a final capture point;

(b) acquiring flight data pertaining to the descent of an aircraft along a flight path defined between the final capture point and a touchdown point on the runway; and (c) providing control signals responsive to the flight data according to at least set of flight guidelines to at least one of the aircraft's primary controls for at least urging the aircraft to essentially adhere to a guide path along at least a portion of its flight path.

Overview of Fuzzy Logic

For the purpose of better understanding the present invention, a brief overview of a fuzzy logic is provided hereinbelow. For a detailed description of fuzzy logic, reference is made to the following sources: (1) "Neural Networks and Fuzzy Systems" by B. Kosko, Prentice Hall Inc., 1992; (2) "Fuzzy Sets, Uncertainty and Information" By G. I. Klir et al, Prentice Hall, 1992; and (3) "Fuzzy Set Theory and Its Applications" by H. J. Zimmerman, Kluwer Nijolt, 1984.

Briefly stated, for achieving a predetermined goal, fuzzy logic requires the preparation of a rule base into which are inputted "crisp" values of input variables for the production of "crisp" values of output variables, the crisp values each representing a particular state of, for example, a mechanical device. Typically, input variables are technical quantities which can be measured directly by sensors, for example, an aircraft's altitude. Alternatively, some input variables can be readily derived from other measurable technical quantities.

For each input and output variable, a series of consecutive membership functions are defined, each series covering the applicable range of feasible states. Adjacent membership functions overlap such that a single crisp value of an input variable is often fuzzified into two or more non-zero fuzzy membership grades or "fuzzy values" of different membership functions. Membership grades are typically defined as falling in the range of [0,1]. Well known shapes of membership functions include, but are not limited to, trapezoid shapes, Gauss shapes, and the like.

A rule base includes one or more rule sets which are linked for the propagation of fuzzy values between consecutive rule sets. In turn, a rule set includes one or more production rules, each of which processes one or more input variables to render one or more output variables. The rule sets are best represented by n-dimensional matrices in which each matrix cell corresponds to a production rule and where n corresponds to the number of input variables participating in a rule set. Each rule set employs an inference rule for processing fuzzy values. Well known inference rules include, but are not limited to, MAX-MIN, MAX-PROD, and the like.

If required, a rule base can include one or more intermediate variables for enabling the creation of far more sophisticated rule bases than could otherwise be achieved if a rule base were to be limited to input and output fuzzy variables. The intermediate variables are also fuzzy variables, however, they have membership labels designating a certain state rather than membership functions. In a similar manner, each membership label can be assigned a membership grade.

In practice, fuzzy logic involves three steps as follows:

The first step is the fuzzification of a "crisp" value of each input variable to its counterpart "fuzzy values" or membership grades of membership functions. The second step is the propagation of the fuzzy values through the rule base for calculating fuzzy values of one or more output variables. And finally, the third step is the defuzzification of the fuzzy values of each output variable to their counterpart crisp value. When an output variable has been assigned two or more non-zero fuzzy values of different membership functions, the crisp value of the output variable is determined by applying a "clipping" or "scaling" function. Well known clipping functions include, but are not limited to, Center-of-Area, Mean-of-Maximum, and the like.

BRIEF DESCRIPTION OF THE DRAWINGS

For a better understanding of the invention and to show how the same can be carried out in practice, reference will now be made, by way of a non-limiting example only, to the accompanying drawings in which:

FIGS. 13–18 are matrix representations of some of the rule sets for controlling the vertical behavior of a UAV;

DETAILED DESCRIPTION OF THE INVENTION

Figure 1:
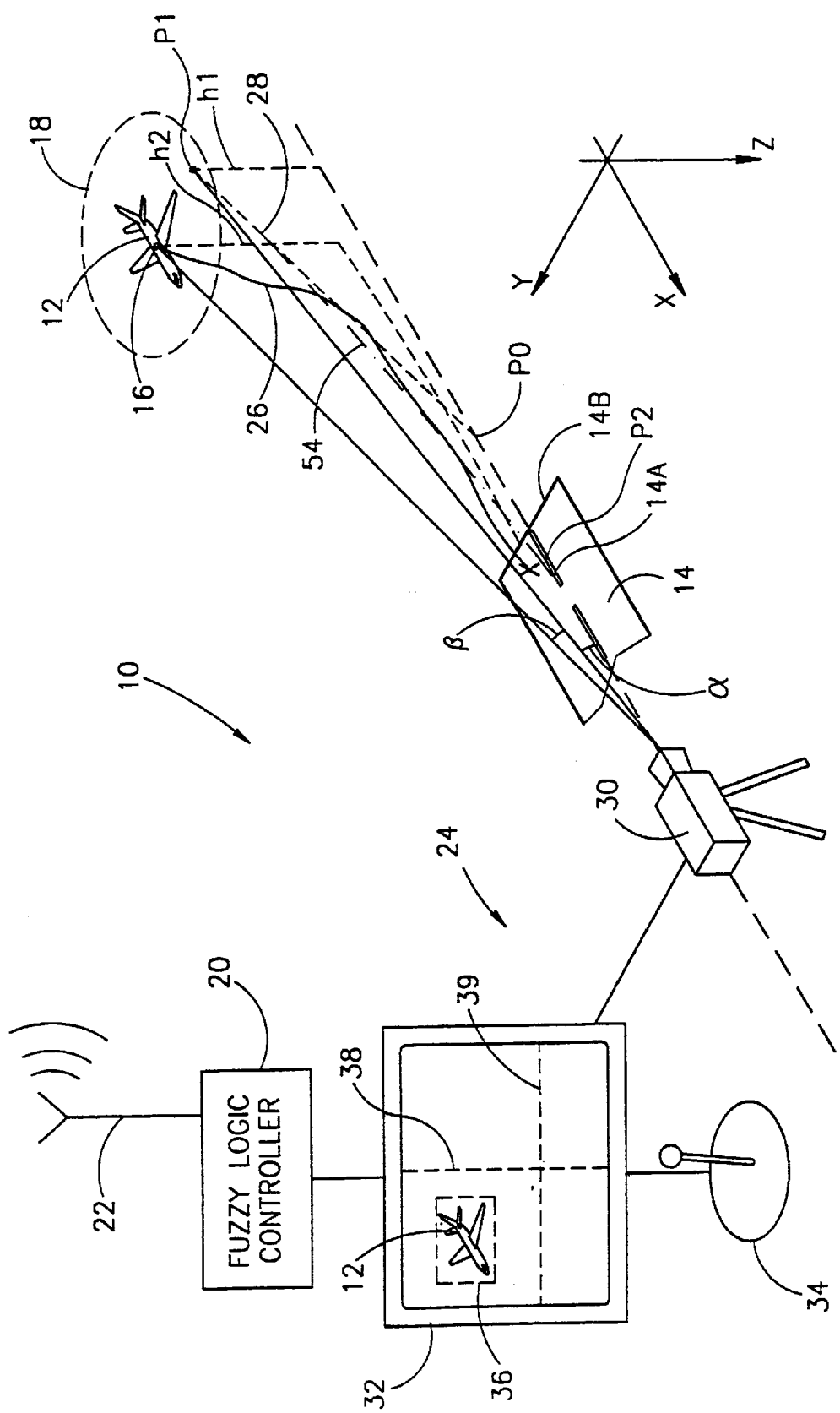
FIG. 1 is a schematic view of an automatic aircraft landing system (AALS) for automatically landing an unmanned air vehicle (UAV) on a runway.

FIG. 1 depicts an automatic aircraft landing system (AALS), generally designated 10, for automatically landing an unmanned air vehicle (UAV) 12 on a runway 14 having a midline 14A and a front edge 14B. Control over the UAV 12 is passed to the AALS 10 by a ground operator who has a conventional model aircraft like control box (not shown) at his disposal so that he can commandeer control over the UAV 12 at any time should it be necessary, for example, in the case that it appears that a successful automatic landing is not feasible.

The AALS 10 receives control over the UAV 12 at a final capture point 16 within a final capture zone 18 depicted as a hashed ellipsoid as long as its flight velocity falls within an acceptable range. For the sake of non-limiting examples, for a UAV, a final capture point 16 typically lies at an altitude of between about 50 m to about 100 m and a slant range of about 600 m to about 1000 m from a theoretical touchdown point on the runway 14 whilst an acceptable flight velocity lies in the range of about 30–60 knots.

The AALS 10 includes a fuzzy logic controller (FLC) 20 for providing control signals via a ground transmitter 22 for controlling the primary flight controls of the UAV 12, namely, its elevator, ailerons, rudder and throttle. Typically, the flaps of the UAV 12 are set to their landing position by the ground operator prior to his transferring control to the AALS 10. The FLC 20 is responsive to flight data captured by data acquisition apparatus (DAA) 24 as the UAV 12 descends along its flight path 26 up to and including its touchdown on the runway 14, preferably along the runway midline 14A.

In the case of a UAV, the control signals issued by the FLC 20 emulate those provided by the model aircraft like control box currently employed by a ground operator in which an up movement of its left stick increases throttle whilst a full down movement corresponds to a throttle's idle state, left and right movements of its left stick respectively induce left and right turns of an UAV, up and down movements of its right stick respectively impart more positive and negative angles to the elevators for inducing an UAV to respectively climb and sink, and left and right movements of its right stick respectively induce left and right banking of an UAV.

To facilitate the production of control signals, the FLC 20 generates a guide path 28 (shown as a hashed line) which is employed a steering aid for the UAV 12. The guide path 28 lies on the plane passing through the runway midline 14A and is defined between a predetermined lower point $P_0$ lying somewhat forward of the front edge 14B and an upper point $P_1$ at an altitude $h_1$ equivalent to the altitude $h_2$ of the final capture point 16 and at the same slant range from the point $P_0$. As such, the guide path 28 is determined adaptively in the sense that its elevation angle is dependent on the spatial location of the final capture point 16. Typically, the elevation angle ($\alpha_g$) of the guide path 28 is between 4°–8°.

The horizontal deviation of a UAV's instantaneous position from the runway midline 14A is defined as being positive (+Y) when the UAV 12 is to the left of the guide path 28 and negative (−Y) when it is to the right. The derivative of the horizontal deviation ($\Delta Y$) is defined as being negative (−$\Delta Y$) when the UAV's flight velocity is diverging away from the guide path 28 whilst it is defined as being positive (+$\Delta Y$) when its flight velocity is converging towards the guide path 28.

In a similar fashion, the vertical deviation of a UAV's instantaneous position is defined as being positive (+Z) when it is below the guide path 28 and negative (−Z) when it is above. And, the derivative of the vertical deviation ($\Delta Z$) is defined as being negative (−$\Delta Z$) when the UAV 12 is climbing relative to the guide path 28 whilst it is defined as being positive (+$\Delta Z$) when the UAV 12 is sinking relative to the guide path 28.

As shown, the DAA 24 is implemented as a low resolution camera 30, a monitor 32 for displaying the camera's field of view and an operator controlled device 34 for tracking the UAV 12 with a cursor 36 whose size is adjustable such that it substantially encompasses the image of the UAV 12 on the monitor 32. A portion or all of the human controlled process of shifting the cursor 36 and adjusting its size can be replaced by functionally equivalent automatic means as is known in the art.

The camera's field of view is set-up symmetrically relative to the runway midline 14A such that the midline's image on the monitor 32 coincides with a vertical midline 38. Furthermore, the camera's field of view is set up at a threshold height (in the order of 1 m) designated by a horizontal line 39 on the monitor such that an operator is immediately aware of a UAV 12 crossing this threshold on its descent irrespective of its slant range from the camera 30.

Using the actual size of a UAV 12 which is known a priori, its slant range from the camera 30 is calculated from the size of the cursor 36 required to substantially encompass its image on the monitor 32. For a known position and attitude of the camera 30, the monitor 32 is calibrated such that the elevation angle ($\alpha$) and the azimuth angle ($\beta$) of an incoming UAV 12 can be read off directly therefrom regardless of its slant range from the camera 30. Based on the above, the FLC 20 can calculate the altitude of a UAV 12, its sink rate and its horizontal deviation from the runway midline 14A from changes in the slant range R, elevation angle $\alpha$ and azimuth angle $\beta$.

Due to the inherent fuzzy nature of the FLC 20, a relatively low resolution camera 30 and relatively large incremental size changes of the cursor 36, say, 20% are acceptable because the operation of the FLC 20 is relatively robust, thereby obviating the need for high precision values from the DAA 24. The use of a low resolution camera 30 is particularly advantageous over conventional high precision positioning apparatus, for example, Global Positioning System (GPS), and the like which could also be implemented for tracking the UAV 12 in view of the fact that the latter are, as a rule, relatively expensive and require complicated maintenance.

Figure 2:
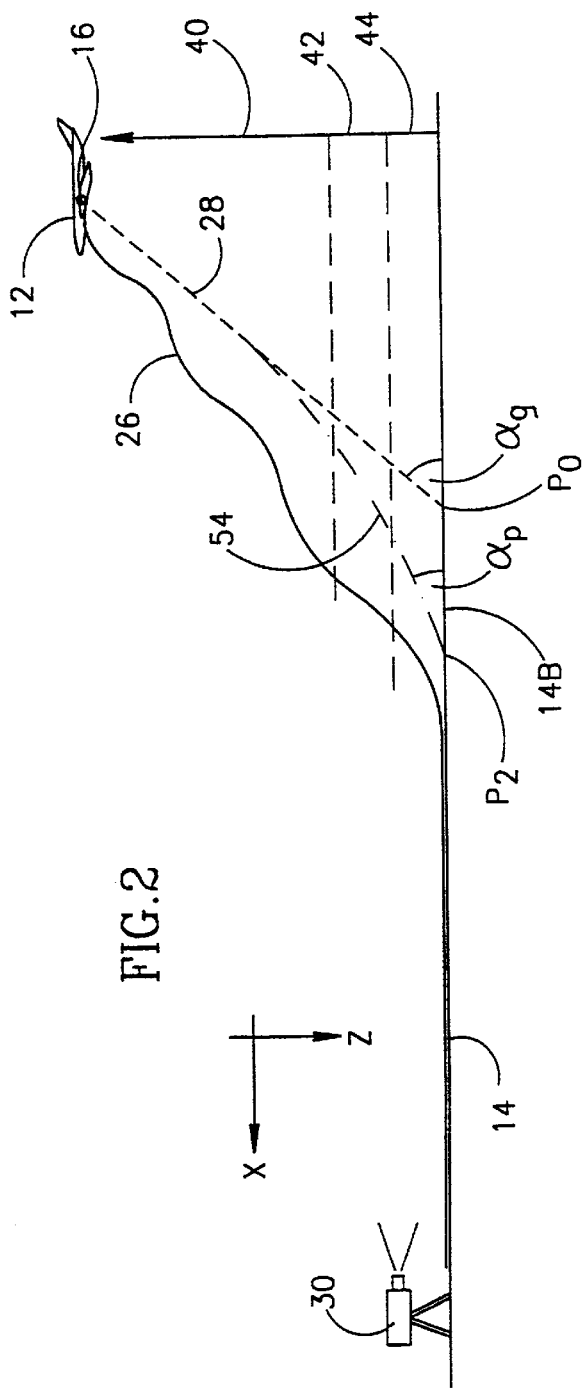
FIG. 2 is a schematic view showing three consecutive flight regions between a final capture point and a touchdown point on a runway.

Turning now to FIG. 2, the FLC 20 applies different sets of flight guidelines to three consecutive flight regions, namely, a glide region 40, a pre-flare region 42 and a flare region 44. The glide region 40 extends downwards from the final capture point 16 to the pre-flare region 42 which, in turn, extends downwards to the flare region 44 which includes the touchdown of the UAV 12 on the runway 14. For the sake of non-limiting examples, the glide region 40, the pre-flare region 42 and the flare region 44 typically extend above about 4.5 m, between about 4.5 m and about 9 m and between touchdown and about 5.5 m, respectively.

The glide region 40, the pre-flare region 42 and the flare region 44 are distinguishable by the glide region 40 having the steepest slope corresponding to the highest sink rate, the pre-flare region 42 having a more moderate slope than the glide region 40 corresponding to an intermediate sink rate and the-flare-region 44 having the most moderate slope corresponding to a near zero sink rate. For the sake of non-limiting examples, the glide region 40, the pre-flare region 42 and the flare region 44 typically have respective slopes of between about 4° to about 7°, about 3° to about 4° and about 0.5° to about 1° corresponding to respective sink rates in the ranges of about 1.5 ms$^{-1}$ to about 2.2 ms$^{-1}$, 0.8 ms$^{-1}$ to about 1.2 ms$^{-1}$ and 0.2 ms$^{-1}$ to about 0.5 ms$^{-1}$.

Figure 3:
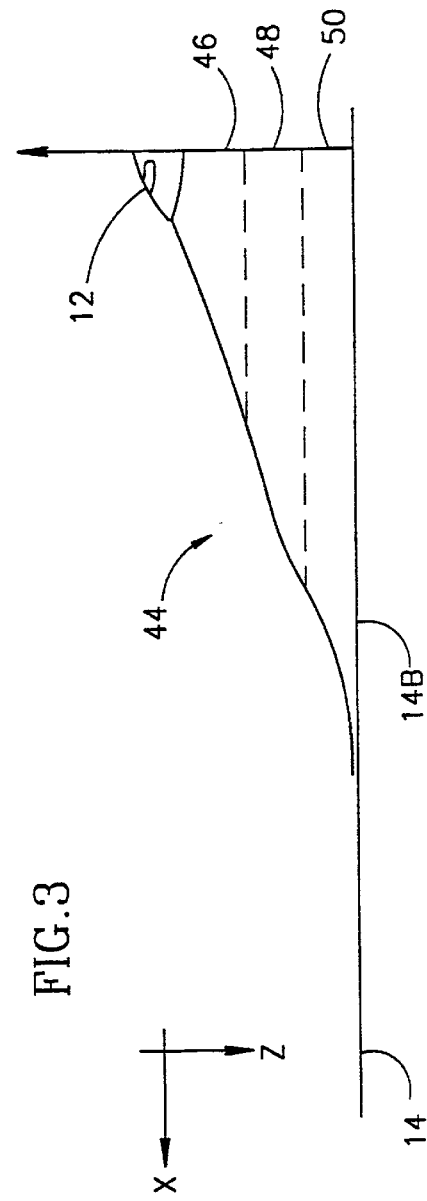
FIG. 3 is a schematic view showing the sub-division of the flare region into three flight sub-regions.

Turning now to FIG. 3, the flare region 44 is further sub divided into three sub-regions, namely, an upper flare region 46, a mid-flare region 48 and a touchdown region 50. For the sake of non-limiting examples, the upper flare region 46, the mid-flare region 48 and the touchdown region 50 typically extend between about 1.5 to about 5.5 m, between about 0.5 m and about 2.0 m and between touchdown and 1.0 m, respectively.

During the glide region 40, the FLC 20 makes particular use of the UAV's vertical and horizontal deviations from the guide path 28 and their derivatives and is adapted to achieve the following set of flight guidelines:

i) ensure that the UAV 12 does not stall in mid-flight;

ii) ensure that the vertical deviation (Z) and its derivative (ΔZ) tend to zero for urging the UAV 12 to coincide with the guide path 28 in the vertical plane; and iii) ensure that the horizontal deviation (Y) and its derivative (ΔY) tend to zero for urging the UAV 12 to coincide with the guide path 28 in the horizontal plane.

The objective of each of the flight guidelines ii) and iii) is to ensure that the UAV 12 converges so as to approach the runway 14 along the guide path 28 in their respective planes whilst not performing any "sharp" maneuvers in their respective planes as evidenced by the values of the derivatives ΔZ and ΔY tending to zero. These objectives are realized when all of the Z, ΔZ, Y and ΔY parameters take on substantially equal to zero values, i.e. when the flight path of the UAV 12 is coincident with the guide path 28. However, it should be noted that each of the flight guidelines ii) and iii) includes potentially conflicting scenarios. For example, in the case of flight guideline ii), the UAV 12 might display an undesirable positive Z displacement and a desired ΔZ value of zero. Thus, the correction required in the Z direction necessarily entails an undesirable effect on an otherwise desired ΔZ. In other words, these objectives are only feasible after a series of discrete increasingly converging steps in which one or other of the pairs of parameters (Z,ΔZ) and (Y,ΔY) may take instantaneous values which are inconsistent with the overall objective of the guideline.

The altitude of the UAV 12 is of greater significance in the pre-flare region 42 than in the glide region 40 due to the closer proximity of the UAV 12 to the runway 14. This fact is taken into account by the flight guidelines of the pre-flare region 42 being identical to the flight guidelines of the glide region 40 with an additional constraint for limiting the UAV's sink rate such that it is more moderate during the pre-flare region 42 than during the glide region 40. In practice, this constraint translates to a modified guide path 54 shown as a hashed line in FIGS. 1 and 2 whose lower point $P_2$ lies beyond the point $P_0$ in the direction of the runway 14. Typically, the elevation angle ($\alpha_p$) of the guide path 54 is between about 3° and 4°. Rather than two straight line segments 28 and 54, a more complicated curved guide path could alternatively be described. Thus, the FLC 20 is adapted to achieve the following set of flight guidelines during the pre-flare region 42:

i) ensure that the UAV 12 does not stall mid-flight;

ii) ensure that the vertical deviation (Z) and its derivative (ΔZ) tend to zero whilst constraining the sink rate of the UAV 12 to a predetermined upper limit, thereby urging the UAV 12 to coincide with the modified guide path 54 in the vertical plane; and iii) ensure that the horizontal deviation (Y) and its derivative (ΔY) tend to zero for urging the UAV 12 to coincide with the modified guide path 54 in the horizontal plane.

As before, the objective of each of the flight guidelines ii) and iii) is to ensure that the UAV 12 approaches the runway 14 along the modified guide path 54 in its respective plane after a series of discrete steps in which one or other of the pairs of parameters (Z,ΔZ) and (Y,ΔY) may take instantaneous values which are inconsistent with the overall objective of the guideline. However, in this case, whilst the Y and ΔY parameters take on substantially equal to zero values when the UAV's flight path is coincident with the modified guide path 54, the Z parameter takes on a uniformly increasing negative value and the ΔZ parameter takes on a substantially uniform negative value.

Notwithstanding the above, during the glide and pre-flare regions 40 and 42, the FLC 20 implements the so-called "counter check" technique as commonly employed by ground operators for controlling the horizontal displacement of a UAV relative to a runway midline. Briefly stated, this technique is designed to enable a relatively quick correction of a horizontal deviation of a UAV despite its relatively slow reaction to flight adjustments induced by its ailerons.

The counter check technique involves three steps and is now described with reference to a UAV which is flying parallel and to the left of a runway. The first step is to adjust its ailerons so as to induce a sharp right banking so as to correct for its left offset relative to the runway midline. This sharp right banking is greater than would otherwise have been necessary were a UAV respond quicker to its ailerons. If left uncorrected, this sharp right banking would cause the UAV to overshoot the runway midline and therefore as it approaches the runway midline from the left, its ailerons are adjusted again to induce a sharp left banking such that the UAV is substantially aligned once again parallel to the runway midline but closer thereto and possibly on either side. Left uncorrected this sharp left banking would cause the UAV to begin to diverge away from the runway midline again and therefore this maneuver is to be interrupted by applying a relatively short sharp control action for right correction (hence the name "counter check"). Thereafter, the ailerons are moved into their neutral position.

The flare region 44 is the most critical region of the flight path 28 by virtue of it including the touchdown on the runway 14. Therefore, during the flare region 44, the FLC 20 makes particular use of the UAV's altitude, its sink rate, its horizontal deviation from the runway midline 14A and the derivative of the horizontal deviation so as to achieve the following set of flight guidelines:

i) ensure that the sink rate of the UAV 12 is near zero whilst ensuring a minimum controlled forward velocity such that the UAV 12 does not stall midflight;

ii) ensure that the UAV 12 has a positive pitch angle for a smooth landing on its rear landing gear;

iii) ensure that the yaw angle of the UAV 12 tends to zero such that the UAV 12 does not run off a side edge of the runway 14; and iv) ensure that the roll angle of the UAV 12 tends to zero such that the tips of the wings of the UAV 12 do not engage the runway 14.

During the flare region 44, the second and third flight guidelines of ensuring that UAV's yaw angle and the roll angle tend to zero entails that the horizontal deviation Y tends to be uniform rather than tending to zero as in the case of the glide region 40 and the pre-flare region 42 i.e. that the UAV 12 approaches parallel and preferably but not necessarily coincident with the runway midline 14A.

As mentioned earlier, the flare region 44 can be regarded as being constituted by three sub-regions, the upper flare region 46, the mid-flare region 48 and the touchdown region 50. The reason for this further sub-division is that some if not all of the above-mentioned flight guidelines of the flare region 44 are more rigidly applied as the altitude of the UAV 12 approaches zero i.e. touchdown on the runway 14. In particular, the steering of the UAV 12 is achieved by the rudder to a greater extent rather than by the ailerons as the UAV 12 approaches touchdown.

After touchdown on the runway 14, the flight guideline of the FLC 20 is to ensure that the UAV 12 runs parallel to the runway midline 14A such that the UAV 12 does not run off a side edge of the runway. This is achieved by steering the UAV 12 by its rudder only, thereby obviating the danger that the tips of the wings of the UAV 12 engage the runway 14. In addition, the elevators are positioned at a more negative angle of attack for urging the UAV 12 against the runway 14 and the throttle is maintained at idle. The UAV 12 proceeds to run parallel to the runway midline 14A until it comes to a complete standstill either by means of a tail hook hitching a cable stretched across the runway 14 or on application of brakes.

Figure 4:
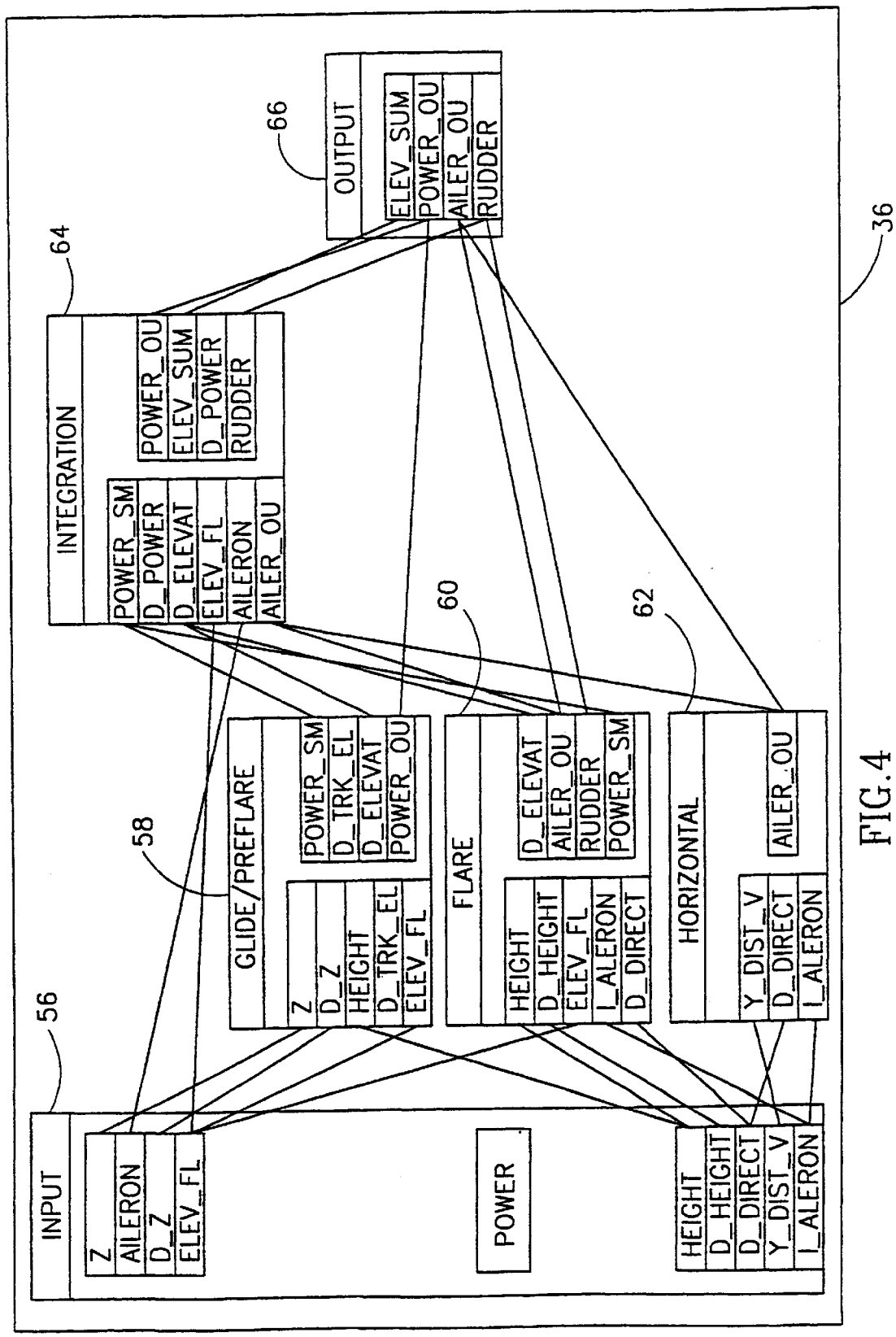
FIG. 4 is a block diagram of the FLC of FIG. 1.

In a preferred implementation of the rule base of the FLC 20 (see FIG. 4) for landing a UAV of the type Hunter, commercially available from Israel Aircraft Industries, Lod, Israel, the rule base processes ten input variables and four intermediate variables for calculating four output variables for controlling the UAV's primary controls. The rule base does not process an input variable representing the position of the throttle which is assumed to be in its idle position. In addition, the implementation assumes a flight velocity at a substantially uniform 50 knot during landing.

As a convention, the membership functions of the input variables and output variables correspond to stick positions of the model aircraft like control box which is hitherto employed for controlling a UAV rather than actual positions of primary controls. In addition, for the sake of convenience, because each stick of the control box issues control signals for two primary controls, the description hereinbelow refers to four control sticks, namely, a throttle stick, a rudder stick, an elevator stick and an aileron stick.

As shown, the FLC 20 is divided into six modules as follows: an INPUT module 56, a GLIDE/PRE-FLARE module 58, a FLARE module 60, a HORIZONTAL module 62, an INTEGRATION module 64 and an OUTPUT module 66. The input variables are shown on the left hand side of the modules whilst the output variables are shown on their right hand side. Some of the fuzzy variables appear on both the left and right hand sides of a module because the modules are shown in condensed form in the sense that they each include two or more rule sets for which a fuzzy variable can be an input variable for one rule set and an output variable for another.

The ten input variables include a fuzzy variable "HEIGHT" representing the altitude of a UAV, a fuzzy variable "D_HEIGHT" representing its sink rate, a fuzzy variable "Z" representing the vertical deviation between a UAV's instantaneous position relative to a guide path, a fuzzy variable "D_Z" representing the derivative of the vertical deviation (Z), a fuzzy variable "Y" representing the horizontal deviation between a UAV's instantaneous position relative to a guide path, a fuzzy variable "D_DIRECT" representing the derivative of the horizontal deviation (Y), a fuzzy variable "ELEV_FL" representing the elevator stick's position, a fuzzy variable "AILERON" representing the aileron stick's position, a fuzzy variable "I_AILERON" representing the integral over time of the current position of the aileron stick as required for performing counter check procedures and a fuzzy variable "POWER" representing the throttle stick's position. The D_DIRECT fuzzy variable is provided in terms the vector velocity angle of a UAV toward a runway midline in units of degrees rather than $ms^{-1}$. The D_DIRECT fuzzy variable carries the value zero when a UAV flies parallel to or coincident with a runway midline.

The intermediate variables include "D_TRK_EL" and "D_ELEVAT" fuzzy variables employed for determining an output variable "ELEV_SUM". The D_TRK_EL fuzzy variable is a precursor to the D_ELEVAT fuzzy variable and, as will become clearer hereinbelow, the D_TRK_EL and the D_ELEVAT fuzzy variables represent relative adjustments to the elevator stick as required during a landing. The intermediate variables also include "POWER_SM" and "D_POWER" fuzzy variables employed for determining an output variable "POWER_OU". The D_POWER fuzzy variable represents additional thrust required during sharp banking of a UAV for compensation of lost lift. The POWER_SM fuzzy variable is employed as the desired position of the throttle stick during a landing.

The output variables include a fuzzy variable "ELEV_SUM" for providing the elevator stick's new position, a fuzzy variable "POWER_OU" for providing the throttle stick's new position, a fuzzy variable "AILER_OU" for providing the aileron stick's new position and a fuzzy variable "RUDDER" for providing the rudder stick's new position.

The INPUT module 56 is employed for fuzzifying crisp values of the input variables and providing them to subsequent modules. In particular, the INPUT module 56 provides the fuzzy values of the Z, D_Z. ELEV_FL and the HEIGHT fuzzy variables to the GLIDE/PRE-FLARE module 58. Furthermore, the INPUT module 56 provides fuzzy values of the HEIGHT, D_HEIGHT, ELEV_AT, I_AILERON and Y_DIST_V fuzzy variables to the FLARE module 60. Still further, the INPUT module 56 provides fuzzy values of the Y, D_DIRECT and I_AILERON fuzzy variables to the HORIZONTAL module 62. And finally, the INPUT module 56 provides the fuzzy values of the ELEV_FL and AILERON fuzzy variables to the INTEGRATION module 64.

The GLIDE/PRE-FLARE module 58 is employed for processing the fuzzy values of the Z, D_Z, HEIGHT, D_TRK_EL and ELEV_FL fuzzy variables so as to calculate fuzzy values for the POWER_SM, D_TRK_EL, D_ELEVAT and POWER_OU fuzzy variables. The GLIDE/PRE-FLARE module 58 provides the fuzzy values of the POWER_SM and D_ELEVAT fuzzy variables to the INTEGRATION module 64 and the fuzzy values of the POWER_OU fuzzy variable to the OUTPUT module 66.

As suggested by its name, the GLIDE/PRE-FLARE module 58 is primarily employed for controlling a UAV during a glide region and a pre-flare region. Thus, the GLIDE/PRE-FLARE module 58 is enabled at relatively high altitudes when the fuzzy value of the GLIDE or PRE-FLARE membership functions of the HEIGHT fuzzy variable equal 1 whilst it is disabled at relatively low altitudes when the fuzzy values of both the GLIDE and the PRE-FLARE membership functions of the HEIGHT fuzzy variable equal 0.

The glide and pre-flare regions are handled by a single module by virtue of the fact that they share common flight guidelines except for the delimiting of the sink rate in the pre-flare region as described hereinabove. During the pre-flare region, the sink rate of a UAV is deduced from the current position of the elevator stick rather than it being directly provided in terms of the D_HEIGHT fuzzy variable. This arrangement is preferable because the current position indicates a future sink rate before it has developed in practice.

The FLARE module 60 is employed for processing the fuzzy values of the HEIGHT, D_HEIGHT, ELEV_FL, I_AILERON and D_DIRECT fuzzy variables so as calculate fuzzy values for the D_ELEVAT, AILER_OU, RUDDER and POWER_SM fuzzy variables. The FLARE module 60 provides the fuzzy values of the D_ELEVAT, AILER_OU and POWER_SM fuzzy variables to the INTEGRATION module 64 and the fuzzy values of the AILER_OU and RUDDER fuzzy variables to the OUTPUT module 66.

As suggested by its name, the FLARE module 60 is primarily employed for controlling a UAV during a flare region. Thus, at relatively high altitudes when the fuzzy value of the flare membership function of the HEIGHT fuzzy variable equals 0, the FLARE module 60 is disabled whilst at relatively low altitudes when the fuzzy values of either the glide or pre-flare membership functions of the HEIGHT fuzzy variable equal 1, the FLARE module 60 is enabled.

The HORIZONTAL module 62 is employed for processing the fuzzy values of the Y, D_DIRECT and I_AILERON fuzzy variables so as calculate fuzzy values for the AILER_OU fuzzy variable. The HORIZONTAL module 62 provides the fuzzy values of the AILER_OU fuzzy variable to the INTEGRATION module 64 and the OUTPUT module 66. As suggested by its name, the HORIZONTAL module 62 is primarily employed for controlling the horizontal maneuvering of a UAV. In contrast to the GLIDE/PRE-FLARE module 58 and the FLARE module 60, the HORIZONTAL module 62 is equally operative throughout all flight regions during a landing.

The INTEGRATION module 64 is employed for processing the fuzzy values of the POWER_SM, D_POWER, D_ELEVAT, ELEV_FL, AILERON and AILER_OU fuzzy variables so as calculate fuzzy values for the POWER_OU, ELEV_SUM, D_POWER and RUDDER fuzzy variables. The INTEGRATION module 64 provides the fuzzy values of the POWER_OU and ELEV_SUM fuzzy variables to the OUTPUT module 66.

As its name suggests, the INTEGRATION module 64 is employed primarily for integrating commands initiating from the GLIDE/PRE-FLARE module 58, the FLARE module 60 and the HORIZONTAL module 62 during a landing so as to resolve potentially conflicting instructions which can arise from different flight guidelines of different flight regions. For example, assuming that Y_DIST_V is relatively large and a UAV is in the flare region, the instruction to bank the UAV sent by the HORIZONTAL module 62 to correct the Y_DIST_V deviation is inhibited so as to comply with the flight guideline that the roll angle and the yaw angle of a UAV tend to zero during a glide region.

The OUTPUT module 66 defuzzifies the fuzzy values of the ELEV_SUM, POWER_SM, AILER_OU and RUDDER fuzzy variables to their corresponding crisp values for the actuation of the elevators, throttle, ailerons and rudder of a UAV, respectively.

Figure 5:
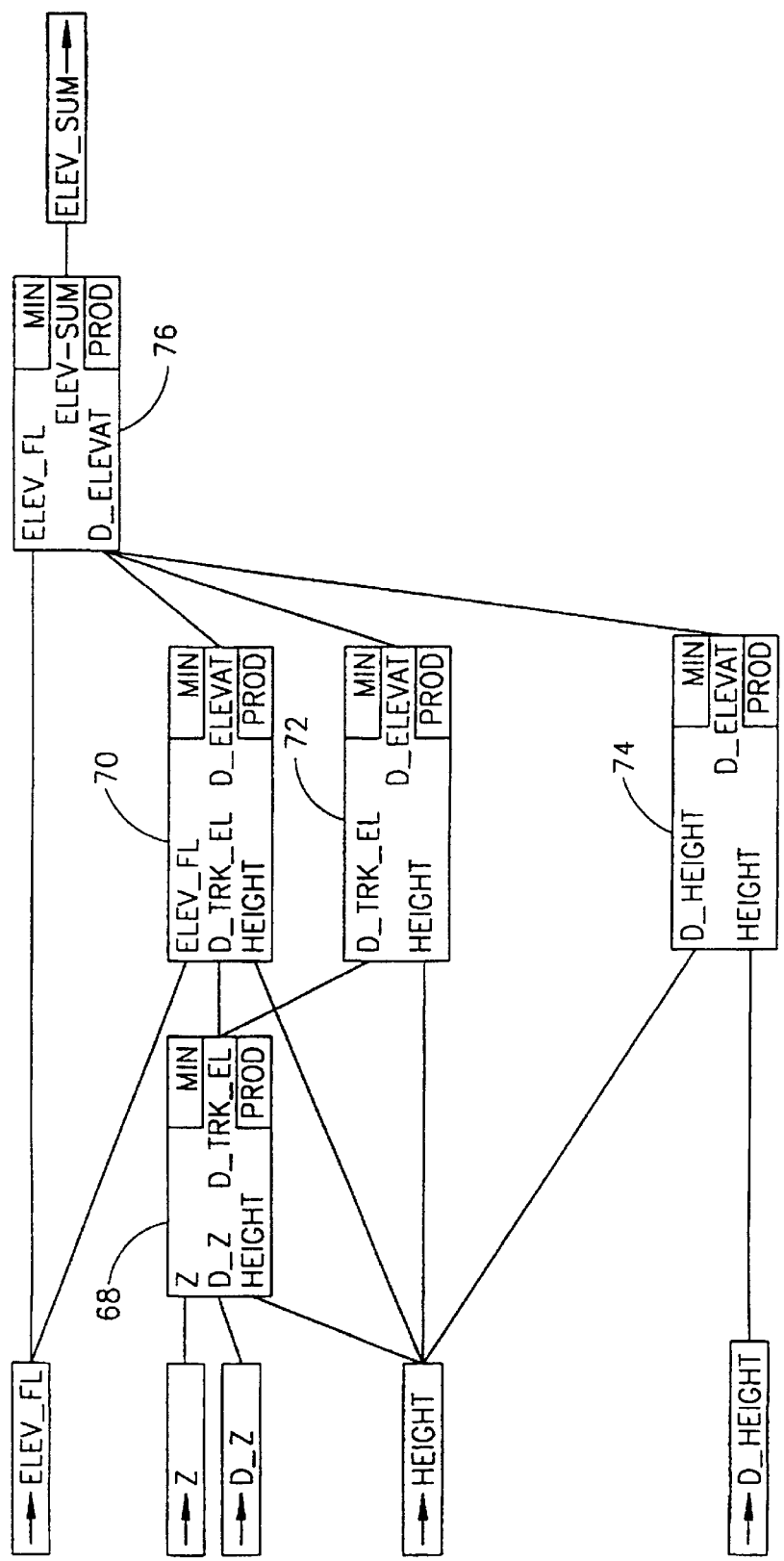
FIGS. 5–7 are block diagrams of the portions of the FLC rule base for respectively controlling the vertical behavior of a UAV, its horizontal behavior and its throttle.
Figure 6:
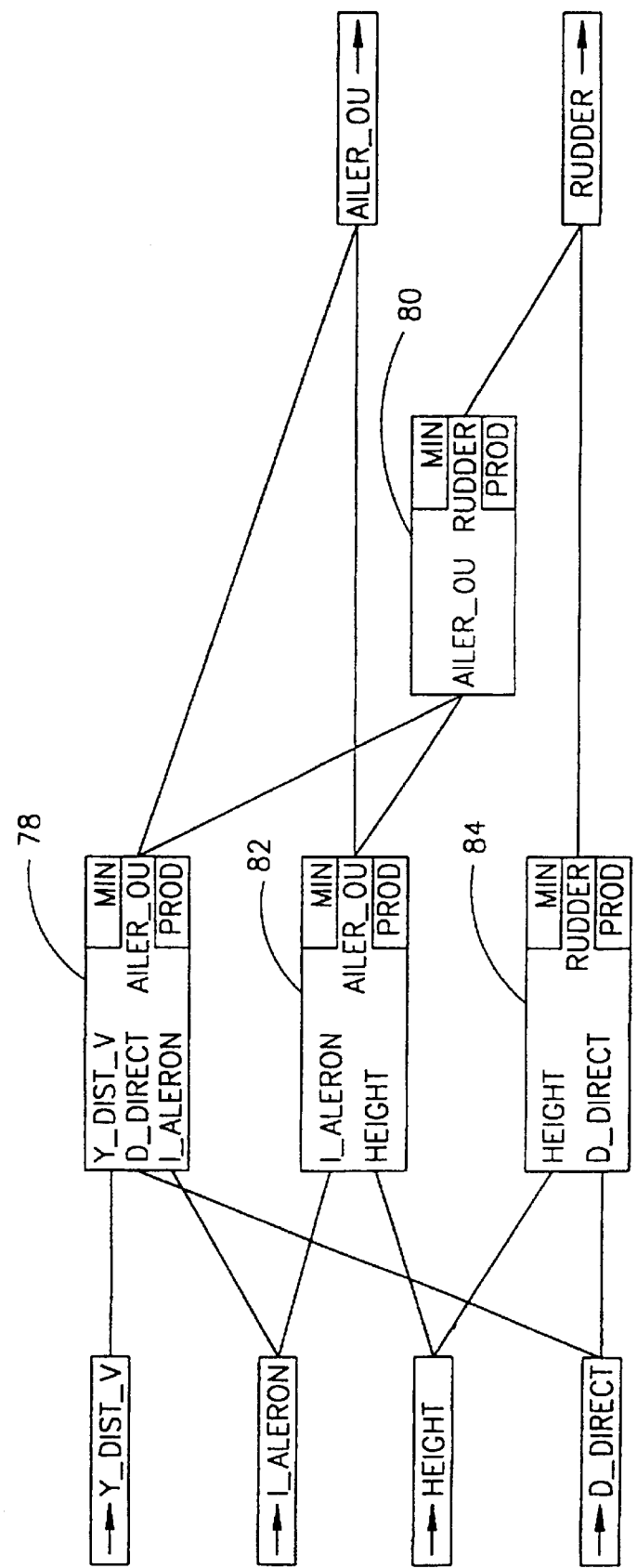
Figure 7:
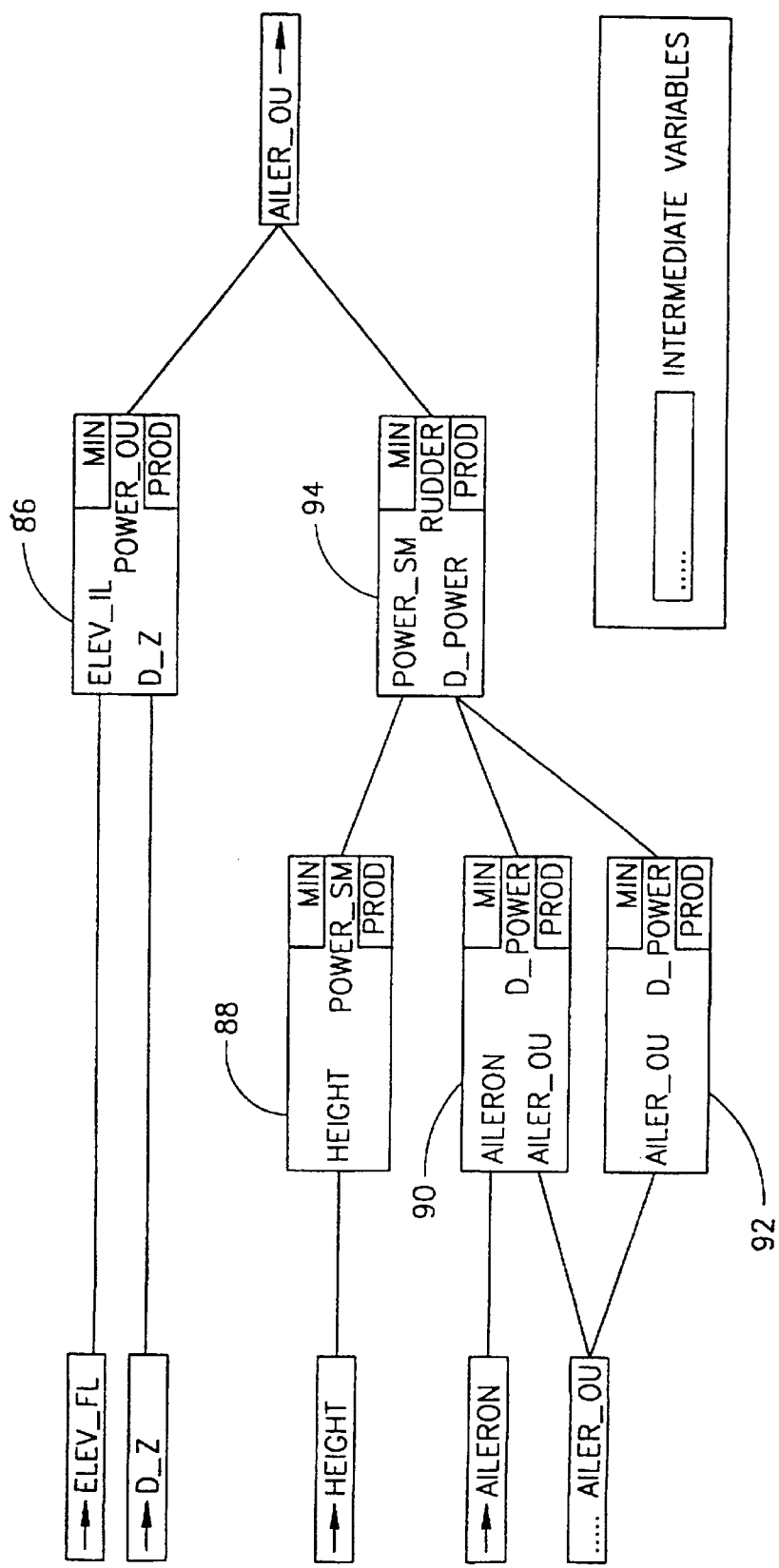

Turning now to FIGS. 5–7, some of the conventions employed in the block diagram of the rules sets are now described. First, fuzzy values are propagated from the left hand side of a rule set to its right hand side. Second, fuzzification of crisp values is indicated by a box to the left of a rule set having an arrow to the left of a fuzzy variable. Third, defuzzification of fuzzy values is indicated by a box to the right of the rule set having an arrow to the right of a fuzzy variable. And lastly, in this case, the rule sets apply the Min Prod inference rule.

Turning now to FIG. 5, the portion of the rule base of the FLC 20 for controlling the vertical behavior of a UAV includes five rule sets 68, 70, 72, 74 and 76 for processing fuzzy values of the HEIGHT, D_HEIGHT, Z, D_Z, and ELEV_FL input variables so as to calculate a new position of the elevator stick as represented by the ELEV_SUM output variable.

The rule set 68 is active during glide and pre-flare regions and is adapted for determining the required addition to the current position of the elevator stick as represented by the D_TRK_EL fuzzy variable by processing the Z and D_Z fuzzy variables. In other words, the rule set 68 employs the Z and D_Z fuzzy variables for determining the required correction to the current position of the elevator stick for urging a UAV towards a guide path 52 in the glide region of its descent. Generally speaking, the rule set 68 assigns negative values to the D_TRK_EL fuzzy variable in the case of an increasing negative or positive vertical deviation Z between a UAV and a guide path and positive values to the D_TRK_EL fuzzy variable in the case of a decreasing negative or positive vertical deviation between a UAV and a guide path.

The rule set 70 is active during a pre-flare region and is adapted for determining the required addition to the current position of the elevator stick as represented by the D_ELEVAT fuzzy variable by processing the ELEV_FL fuzzy variable and D_TRK_EL fuzzy variable. In effect, the rule set 70 restricts the negative value of the elevator stick and therefore a UAV's sink rate. Thus, in the case that the current position of the elevator stick indicates that a UAV is sinking and the rule set 68 has assigned a negative label to the D_TRK_EL fuzzy variable, then the rule set 70 acts to moderate the negative label of the D_TRK_EL fuzzy variable to a more positive label.

The rule set 72 is active during glide and pre-flare regions and is adapted as a means for conveying the value of the D_TRK_EL fuzzy variable as the D_ELEVAT fuzzy variable to the rule set 76.

The rule set 74 is active during a flare region and is adapted for determining the required addition to the current position of the elevator stick as represented by the D_ELEVAT fuzzy variable by processing the D_HEIGHT fuzzy variable. In other words, the rule set 74 employs a UAV's sink rate for determining the required position of the elevator stick for a final landing approach. Generally speaking, the rule set 74 assigns positive values to the D_ELEVAT fuzzy variable for higher sink rates and either zero or slightly negative values to the D_ELEVAT fuzzy variable for lower sink rates.

The rule set 76 is active during all the flight regions and is adapted for determining the new position of the elevator stick as represented by the ELEV_SUM fuzzy variable by processing the ELEV_FL and D_ELEVAT fuzzy variables. In other words, the rule set 76 is employed to integrate the prevailing position of the elevator stick with the required addition to the current position of the elevator stick in line with the flight guidelines of the different flight regions.

Turning now to FIG. 6, the portion of the rule base of the FLC 20 for controlling the horizontal maneuvering of a UAV includes four rule sets 78, 80, 82 and 84 for processing fuzzy values of Y_DIST_V, D_DIRECT, I_AILERON, and HEIGHT input variables so as to calculate new positions of a UAV's ailerons and rudder as represented by the AILER_OU and RUDDER output variables, respectively.

The rule set 78 is enabled during all flight regions and is adapted to perform the counter check technique by processing the Y_DIST_V, D_DIRECT and I_AILERON fuzzy variables for controlling the new position of the aileron stick as represented by the AILER_OU fuzzy variable. Generally speaking, the rule set 78 monitors the I_AILERON fuzzy variable so as to determine the manner in which a UAV is approaching a runway in the horizontal plane. In the case that the fuzzy value of the I_AILERON fuzzy variable is small, then the rule set 78 enables a smooth approach to a runway midline. In the case that the fuzzy value of the I_AILERON fuzzy variable is large, then as the horizontal deviation Y tends to zero and the D_DIRECT fuzzy variable tends to zero, so the rule set 78 performs the counter check technique.

The rule set 80 is enabled during all flight regions and is adapted to synchronize the new position of the rudder stick as represented by the RUDDER fuzzy variable with the new position of the aileron as represented by the AILER_OU fuzzy variable as provided by the rule set 78.

The rule set 82 is enabled during a flare region, in particular toward touchdown on a runway, and is adapted for moderating the new position of the aileron stick as instructed from the rule set 78 if necessary so as to achieve the flight guideline "roll angle tend to zero" of the flare region. In other words, as a UAV is about to land on a runway, the rule set 82 overrides any command from the rule set 80 such that the ailerons are set to their neutral position.

The rule set 84 is enabled during a flare region, in particular toward touchdown on a runway, and is adapted for the determining the new position of the rudder stick to achieve the flight guideline "yaw angle equals zero". In particular, as a UAV is about to land on a runway, the rule set 84 controls its rudder for steering it parallel to a runway midline.

And lastly, turning now to FIG. 7, the portion of the rule base of the FLC 20 for controlling the throttle of a UAV as represented by the POWER_OU fuzzy variable includes five rule sets 86, 88, 90, 92 and 94 for processing the ELEV_FL, D_Z. HEIGHT and AILERON input variables and the AILER_OU output variable.

The rule set 86 is enabled during glide and pre-flare regions and is adapted to provide extra throttle as represented by the POWER_OU fuzzy variable in the case of a potential stall of a UAV as evidenced by a highly positive value of the D_Z fuzzy variable when the crisp value of the ELEV_FL indicates a full up position of the elevator stick.

The rule set 88 is enabled during all flight regions and is adapted to provide the desired position of the throttle stick during a landing, namely, in its idle position as mentioned hereinabove.

The rule sets 90 and 92 are enabled during all flight regions and are adapted to provide extra throttle to increase lift in the case of a sharp horizontal maneuver. The rule sets 90 and 92 can be combined into a single rule set, however, are preferable implemented as shown for reducing the number of production rules.

The rule set 94 determines the new position of the throttle stick as represented by the POWER_OU fuzzy variable by processing the POWER_SM and D_POWER fuzzy variables.

As representative of the fuzzy variables employed by the FLC 20 as a whole, FIGS. 8–12 illustrate the membership functions of the input variables associated with the vertical behavior of a UAV and the manner of fuzzification of the following set of crisp values: HEIGHT=10 m, D_HEIGHT=1.9 ms$^{-1}$, Z=2.5 m, D_Z=1.3 ms$^{-1}$ and ELEV_FL is 20%.

Figure 8:
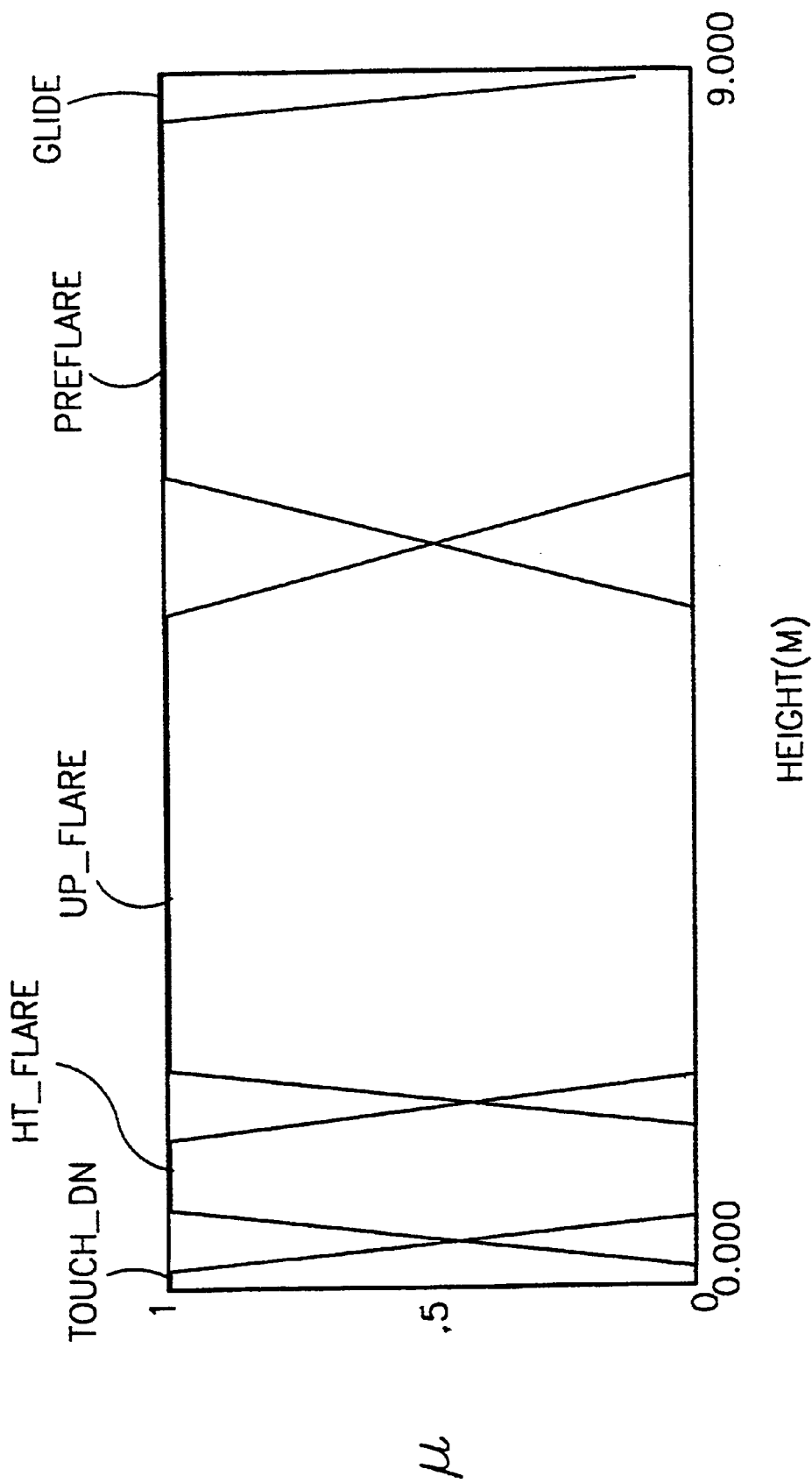
FIGS. 8–12 are graphs respectively showing the membership functions of the following fuzzy variables: "HEIGHT", "D_HEIGHT", "Z", "D_Z" and "ELEV_FL" ("ELEV_SUM")

Thus, FIG. 8 shows that the fuzzy variable "HEIGHT" has been assigned the following membership functions: TOUCH_DN (DN standing for down) for less than 0.5 m, HT_FLARE between 0.2 m and 1.6 m, UP_FLARE between 1.2 m and 6 m, PRE_FLARE between 5.0 m and 9.0 m and GLIDE greater than 5 m. In effect, the definition of the PRE-FLARE membership function as a sub-set of the GLIDE membership function translates to a saving in terms of the number of production rules.

Figure 9:
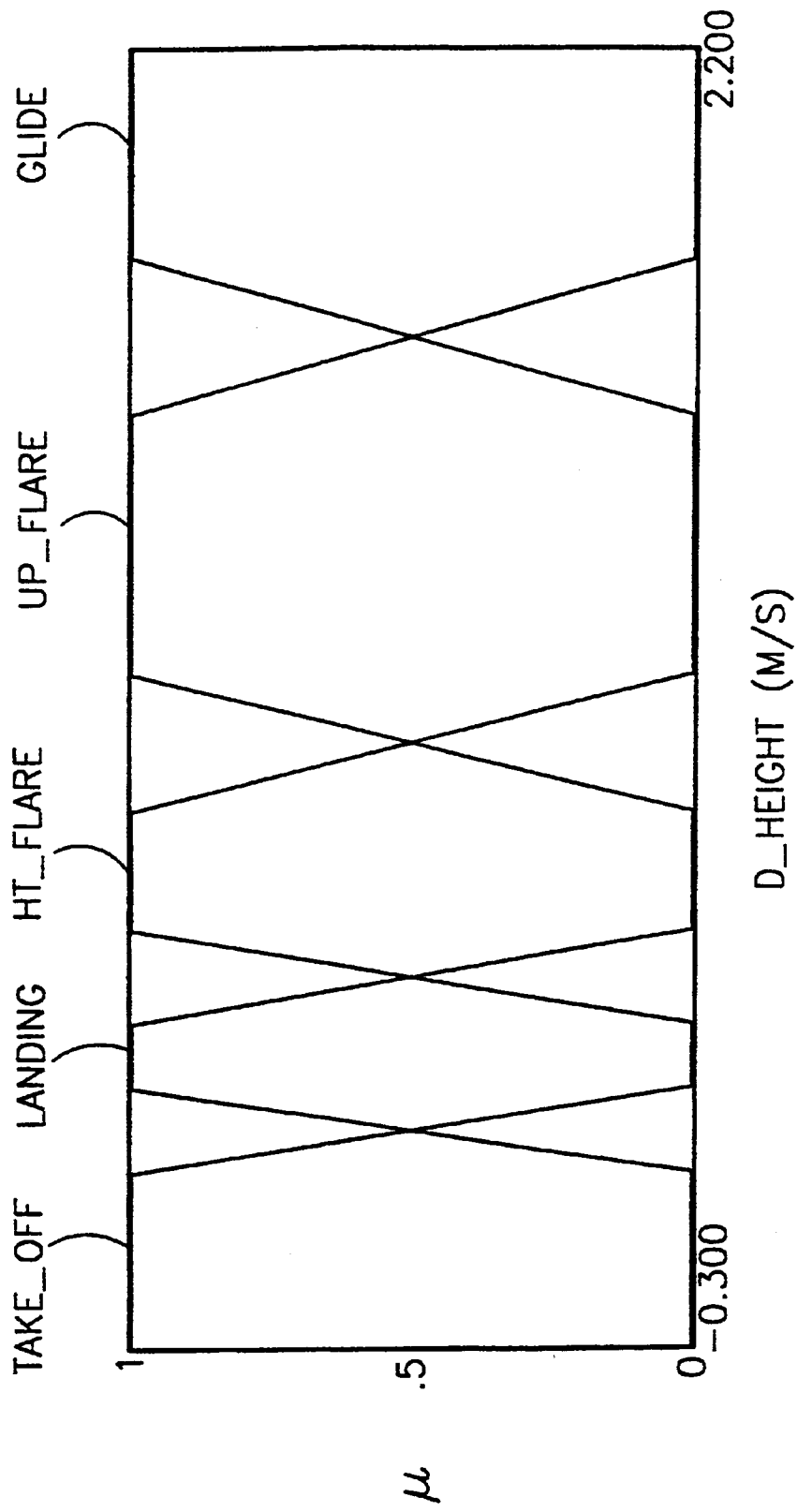

And similarly FIG. 9 shows that the fuzzy variable "D_HEIGHT" has been assigned the following membership functions: TAKE_OFF less than 0.2 ms$^{-1}$, LANDING between 0 and 0.5 ms$^{-1}$, HT_FLARE between 0.3 and 0.9 ms$^{-1}$, UP_FLARE between 0.7 and 1.8 ms$^{-1}$ and GLIDE greater than 1.8 ms$^{-1}$.

Figure 10:
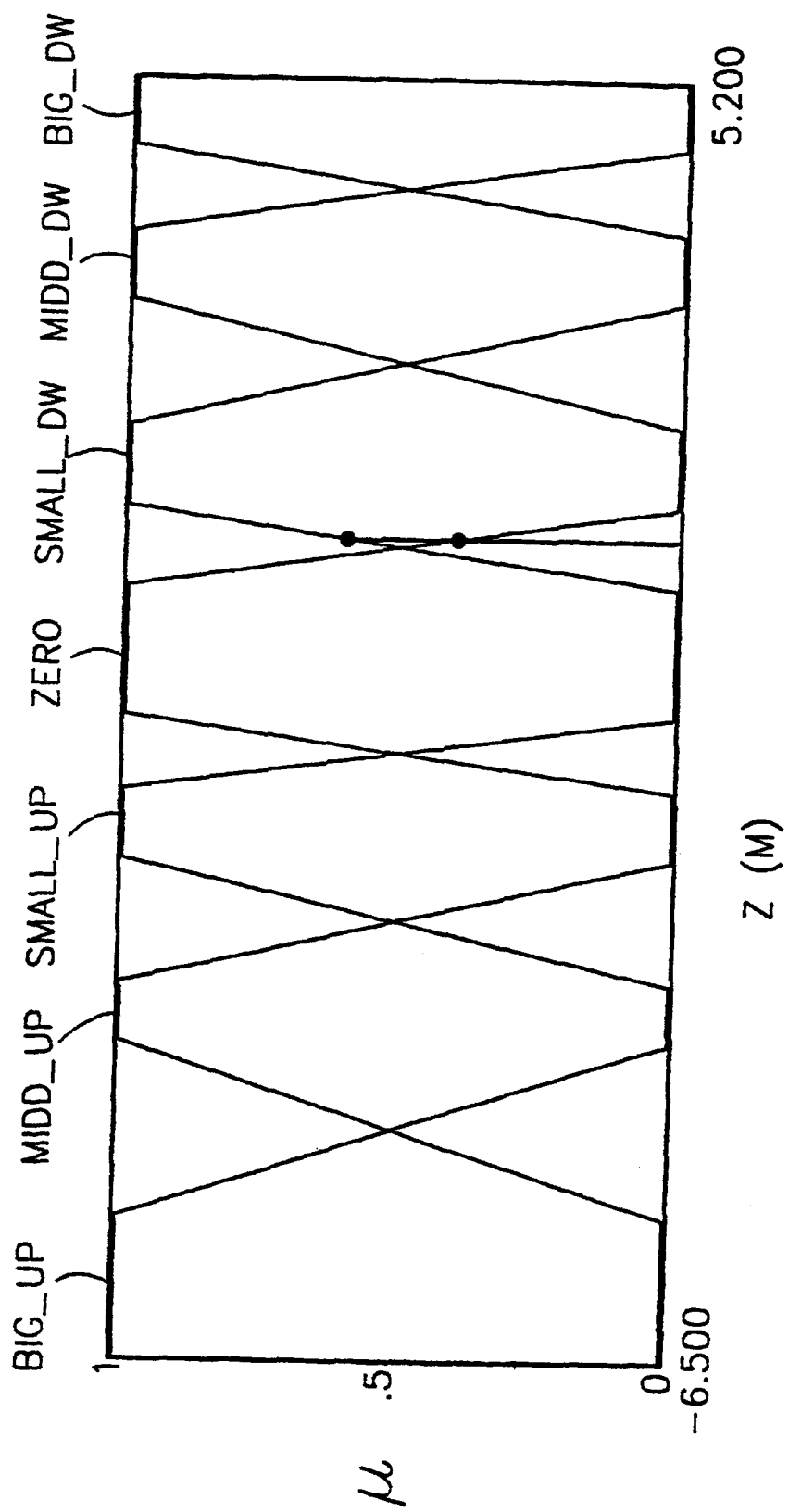

And similarly FIG. 10 shows that the fuzzy variable "Z" has been assigned the following membership functions: BIG_UP, MIDD_UP, SMALL_UP, ZERO, SMALL_DW, MIDD_DW and BIG_DW (DW standing for down). The crisp values of the BIG_DW membership function are less than the corresponding values of the BIG_UP membership function because there is more inherent danger to a UAV when it is beneath a guide path in contrast as to when it is above a guide path. Thus, for the same absolute vertical deviation, by skewing the BIG_DW membership function, the FLC 20 will act earlier when the vertical deviation is positive than for when the vertical deviation is negative.

Figure 11:
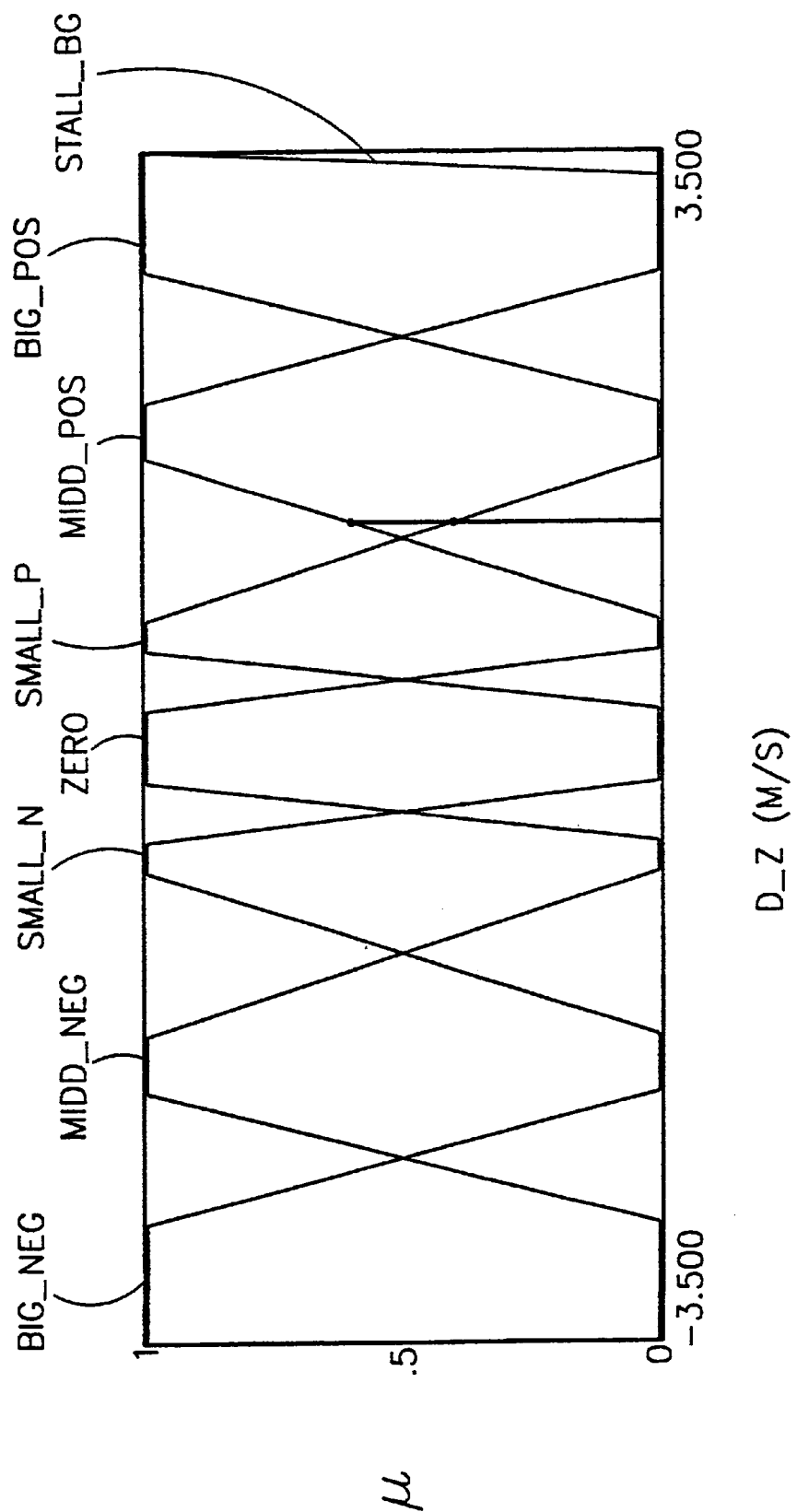

And similarly FIG. 11 shows that the fuzzy variable "D_Z" has been assigned the following membership functions: BIG_NEG, MIDD_NEG, SMALL_N (N or NEG standing for negative), ZERO, SMALL_P, MIDD_POS, BIG_POS and STALL_BG (P or POS standing for positive). The label STALL_BG has been employed so as to indicate that the rule set 86 is in effect only activated when the D_Z fuzzy variable takes this value.

Figure 12:
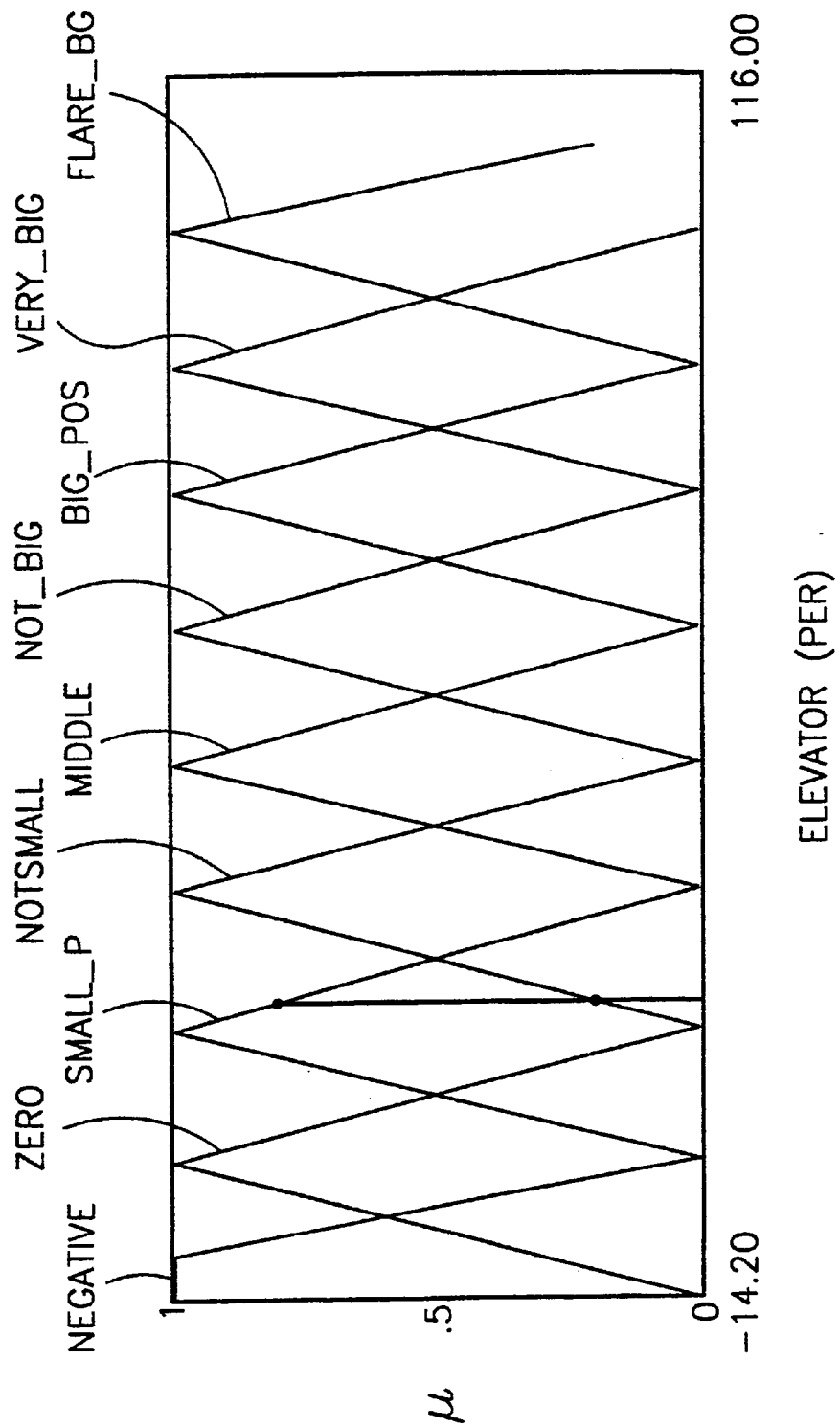

And finally FIG. 12 shows that the fuzzy variables "ELEV_FL" and "ELEV_SUM" have been assigned the following membership functions: NEGATIVE, ZERO, SMALL_P, NOTSMALL, MIDDLE, NOT_BIG, BIG, VERY_BIG and FLARE_BG corresponding to the range of the –14% to the climb position +116% (full down) of the elevator stick. It should be noted that at idle throttle, the NEGATIVE, ZERO and SMALL_P positions of the elevator stick induce the UAV to sink. The upper limit of 116% ensures that during a flare region, the position of the elevator stick can be set to maximum for decreasing the sink rate and velocity of the UAV.

The fuzzy variables "D_TRK_EL" and "D_ELEVAT" can be assigned one or more of the labels: BIG_NEG, MIDDLE_N, SMALL_N. ZERO, SMALL_P, MIDDLE_P and BIG_POS in which BIG_NEG and/or BIG_POS correspond to a linguistic definition of an incremental change in the position of the elevator stick. For example, a production rule can specify that for the "BIG_NEG" label of the D_TRK_EL fuzzy variable and the "ZERO" membership function of the ELEV_FL input variable, then the ELEV_SUM output fuzzy variable is assigned the "NEGATIVE" membership function. Conversely, a production rule can specify that for the "BIG_POS" label of the D_TRK_EL fuzzy variable and the "ZERO" membership function of the ELEV_FL input variable, the ELEV_SUM output fuzzy variable is assigned the "SMALL_P" membership function.

For the above set of crisp values: HEIGHT=10 m, D_HEIGHT=1.9 ms$^{-1}$, Z=2.5 m, D_Z=1.3 ms$^{-1}$ and ELEV_FL is 20%, FIG. 8 shows that the HEIGHT=10 m is fuzzified as the fuzzy value 1.0 of the membership function "GLIDE", FIG. 9 shows that D_HEIGHT=1.9 ms$^{-1}$ is fuzzified as the fuzzy value 1.0 of the membership function "GLIDE", FIG. 10 shows that Z=2.5 m is fuzzified as the fuzzy value 0.7 of the membership function "SMALL_DW" and the fuzzy value 0.3 of the membership function "MIDD_DW", FIG. 11 shows that D_Z=1.3 ms$^{-1}$ is fuzzified as the fuzzy value 0.4 of the membership function "MID_POS" and the fuzzy value 0.6 of the membership function "BIG_POS" and lastly, FIG. 12 shows that ELEV_FL=20% is associated with the fuzzy value 0.8 of the membership function "SMALL_P" and the fuzzy value 0.2 of the membership function "NOTSMALL".

Turning now to FIGS. 13–18, the matrix representations of the rule sets 68, 70, 72, 74 and 76 enable an example of the processing of a vertical maneuver by the FLC 20 to be shown for the above set of crisp values. For the sake of clarity, some of the conventions employed in the example are now described. First, a marking against one of the membership functions in the column of an input variable listing its membership functions indicates that a particular matrix is applicable for that membership function only. In some cases, this convention provides a convenient technique for distinguishing between two dimensional matrices of a rule set. Second, a blank portion of a matrix indicates that a rule set is not active for those fuzzy variable combinations which intersect at those cells constituting the blank portion.

Turning now to FIG. 13, the matrix representation of the rule set 68 shows that is only enabled for the single membership function "GLIDE" of the HEIGHT fuzzy variable as indicated by the marking in the column denoted "HEIGHT". As can be seen, four cells of the rule set 68 are active as indicated by the mark at the intersection of the SMALL_DW and MIDD_DW membership functions of the Z fuzzy variable and the SMALL_P and MIDD_PO membership functions of the D_Z fuzzy variable.

The first active cell provides the label SMALL_P of the D_TRK_EL fuzzy variable as the resultant of the production rule involving the membership function SMALL_DW of the Z fuzzy variable and the membership function SMALL_P of the D_Z fuzzy variable. The second active cell provides the label SMALL_P/MIDDLE_P of the D_TRK_EL fuzzy variable as the resultant of the production rule involving the membership function SMALL_DW of the Z fuzzy variable and the membership function MIDD_PO of the D_Z fuzzy variable. The third active cell provides the label SMALL_P of the D_TRK_EL fuzzy variable as the resultant of the production rule involving the membership function MIDD_DW of the Z fuzzy variable and the membership function SMALL_P of the D_Z fuzzy variable. And lastly, the fourth active cell provides the label MIDDLE_P of the D_TRK_EL fuzzy variable as the resultant of the production rule involving the membership function MIDD_DW of the Z fuzzy variable and the membership function MIDD_P of the D_Z fuzzy variable.

On application of the first stage of the Min Prod inference rule, the first cell carries a 0.4 value for the SMALL_P label, the second cell carries a 0.6 value for the SMALL_P/MIDDLE_P label, the third cell carries a 0.3 value for the SMALL_P label and the fourth cell carries a 0.3 value for the MIDDLE_P label. Thereafter, on application of the second step of the Min Prod inference rule, the rule set 68 selects the maximum value for each of the labels SMALL_P and MIDDLE_P of the D_TRK_EL fuzzy variable and therefore, in this case, returns values of 0.6 for both SMALL_P and MIDDLE_P labels.

Figure 14:
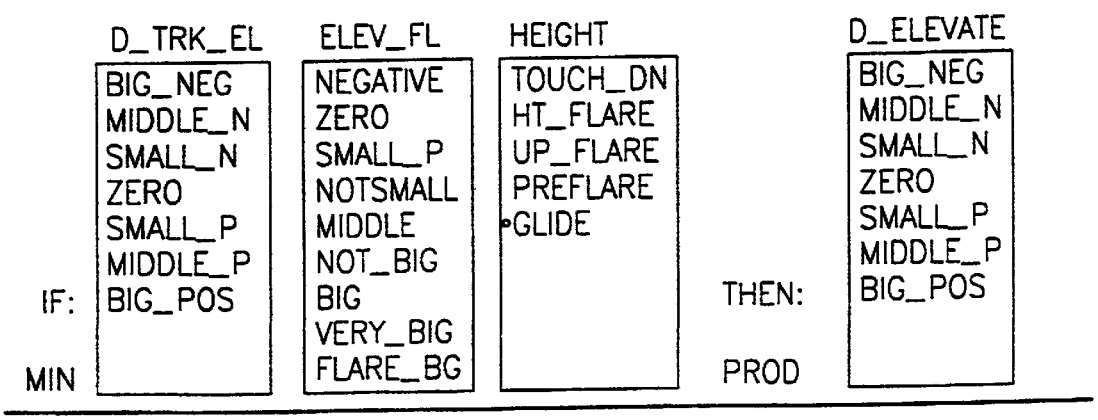

Turning now to FIG. 14, the rule set 70 is enabled for a glide region as indicated by the markings against the "GLIDE" membership function of the column denoted "HEIGHT". In this case, as indicated by the marking on the matrix, the rule set 70 translates the D_TRK_EL fuzzy variable as the D_ELEVAT fuzzy variable for the values 0.6 of the SMALL_P and MIDDLE_P labels of the D_TRK_EL fuzzy variable.

Figure 15:
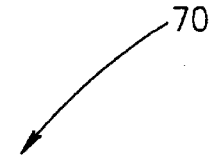

Turning now to FIG. 15, the rule set 70 is enabled for a pre-flare region as indicated by the markings against the "PRE-FLARE" membership function of the column denoted "HEIGHT". This rule set 70 is not enabled by virtue of the altitude of the UAV 12 being 10 m.

Turning now to FIG. 16, the matrix representation of the rule set 72 shows the translation of the values of the BIG_NEG, MIDDLE_N, SMALL_N and ZERO labels of the D_TRK_EL fuzzy variable to the values of the equivalent BIG_NEG, MIDDLE_N, SMALL_N and ZERO membership functions of the D_ELEVAT fuzzy variable for propagation to the rule set 76 as mentioned hereinabove. In this case, in the event that the rule set 68 provided the values 0.6 to both the SMALL_P and MIDDLE_P labels of the D_TRK_EL fuzzy variable, none of the cells of the rule set 72 are activated as evidenced by the lack of a suitable mark.

Figure 17:
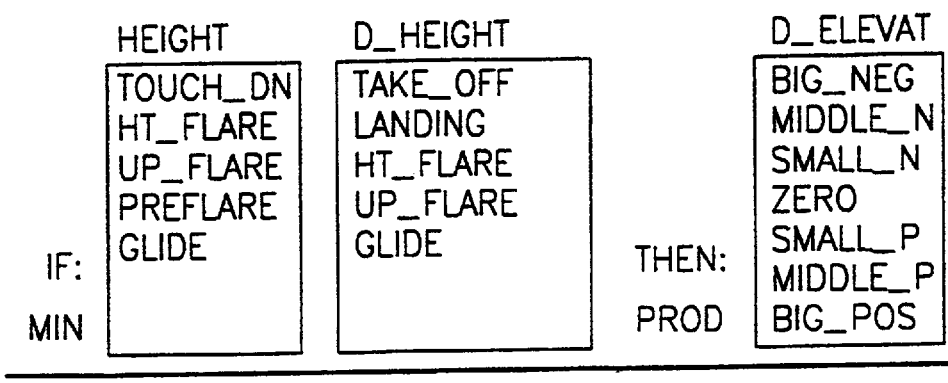

Turning now to FIG. 17, the matrix representation of the rule set 74 shows that it is only enabled for a flare region as indicated by the blank portion of the matrix for the PRE-FLARE and GLIDE membership functions of the HEIGHT fuzzy variable and therefore is disabled for the purposes of the present example in which height=10 m.

Turning now to FIG. 18, the matrix representation of the rule set 76 indicates that four cells are active as indicated by the mark at the intersection of the SMALL_P and NOTSMALL membership functions of the ELEV_AT fuzzy variable and the SMALL_P and MIDD_PO labels of the D_ELEVAT fuzzy variable.

The rules in the first active cell provide the membership functions SMALL_P and NOTSMALL/3 of the ELEV_SUM fuzzy variable as the resultant of the production rule involving the membership function SMALL_P of the ELEV_FL fuzzy variable and the label SMALL_P of the D_ELEVAT fuzzy variable. The rules of the second active cell provide the membership function SMALL_P and NOTSMALL/2 of the ELEV_SUM fuzzy variable as the resultant of the production rule involving the membership function SMALL_P of the ELEV_FL fuzzy variable and the label MIDD_PO of the D_ELEVAT fuzzy variable. The rules of the third active cell provide the membership function NOTSMALL and MIDDLE/3 of the ELEV_SUM fuzzy variable as the resultant of the production rule involving the membership function NOTSMALL of the ELEV_FL fuzzy variable and the label SMALL_P of the D_ELEVAT fuzzy variable. And lastly, the rules of the fourth active cell provide the membership function NOTSMALL and MIDDLE/2 of the ELEV_SUM fuzzy variable as the resultant of the production rule involving the membership function NOTSMALL of the ELEV_FL fuzzy variable and the label MIDDLE_PF the D_ELEVAT fuzzy variable.

On application of the first stage of the Min Prod inference rule, the first cell carries a 0.6 value for the SMALL_P membership function and 0.2 for the NOTSMALL membership function, the second cell carries a 0.6 value for the SMALL_P membership function and a 0.3 value for the NOTSMALL membership finction, the third cell carries a 0.2 value for the NOTSMALL membership function and a 0.07 value for the MIDDLE membership function and the fourth cell carries a 0.2 value for the NOTSMALL membership function and a 0.1 value for the MIDDLE membership function. Thereafter, on application of the second step of the Min Prod inference rule, the rule set 76 selects the maximum value for each of the SMALL_P, NOTSMALL and MIDDLE membership functions of the ELEV_SUM fuzzy variable and therefore, in this case, returns values of 0.6 for the SMALL_P membership function, 0.3 for the NOTSMALL membership function and 0.1 for the MIDDLE membership function.

Figure 19:
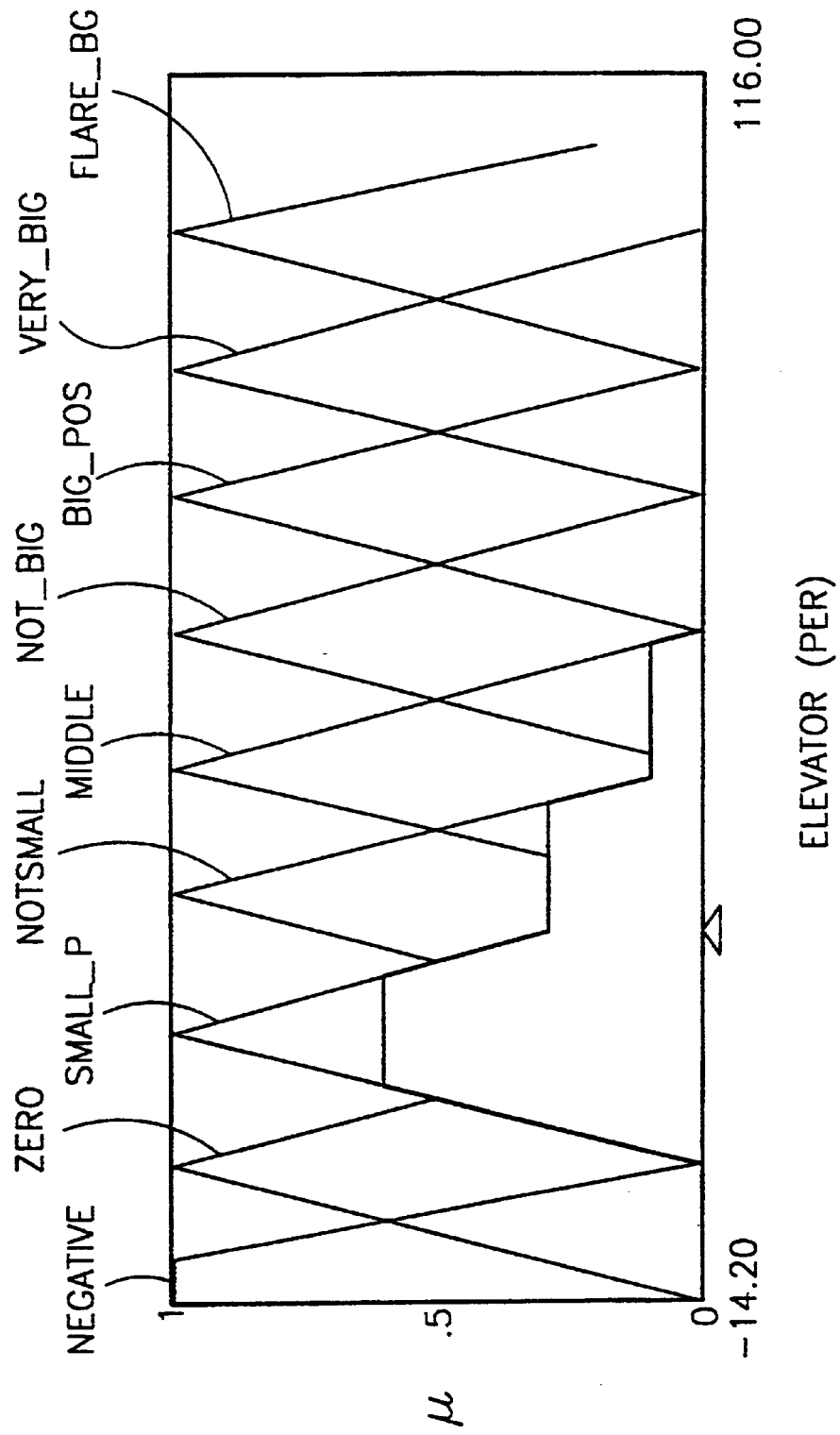
FIG. 19 shows a scaling or clipping function for defuzzifying the fuzzy values of the fuzzy variable ELEV_SUM to a corresponding crisp value of an elevator stick.

Turning now to FIG. 19, having obtained the three fuzzy values of the ELEV_SUM fuzzy variable, a "scaling" or "clipping" procedure is activated for defuzzifying the fuzzy values for producing a crisp value command for the elevator.

Figure 20:
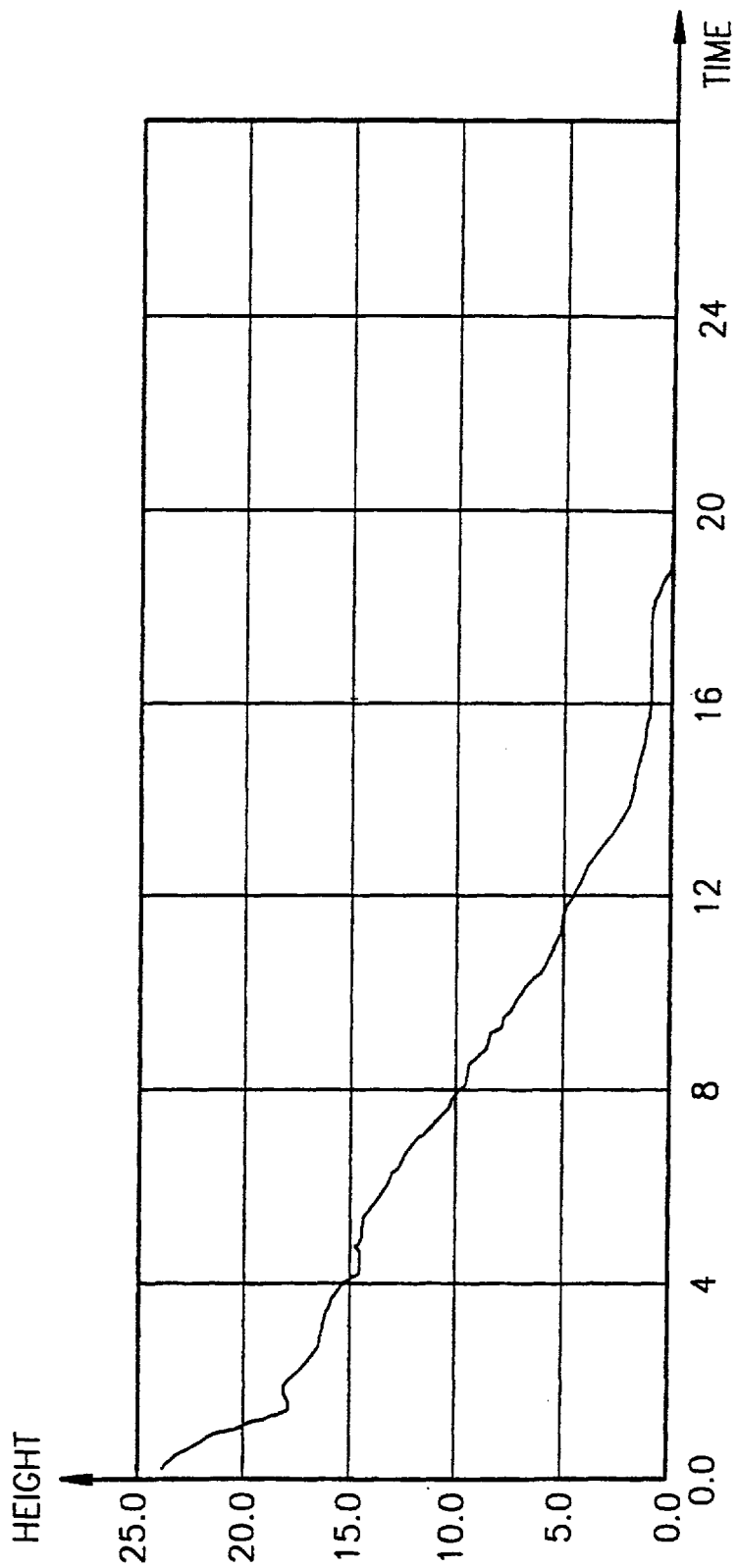
FIG. 20 graphically shows a successful automatic landing of a Hunter UAV.

With reference now to FIG. 20, the automatic landing of a Hunter UAV initiated with its capture at an altitude of about 15 m, a distance of about 350 m from a runway and a substantially uniform flight velocity of about 50 knots. During the glide region, the FLC guided the UAV to an altitude of about 9 m over a distance of about 70 m corresponding to a slope gradient of 4.5° and a sink rate of 2.5 ms$^{-1}$. During the pre-flare region, the FLC guided the UAV from an altitude of about 9 m to an altitude of about 5 m over a distance of about 120 m corresponding to a slope gradient of 2.5° and a sink rate of 2.0 ms$^{-1}$. During the upper-flare region, the FLC guided the UAV from an altitude of about 5 m to an altitude of about 1.5 m over a distance of about 80 m corresponding to a slope gradient of 2.2° and a sink rate of 1.4 ms$^{-1}$. During the mid-flare and touchdown regions, the FLC guided the UAV from an altitude of about 1.5 m to touchdown over a distance of about 80 m corresponding to a slope gradient of 1° and a sink rate of 1 ms$^{-1}$.

While the invention has been described with respect to a limited number of embodiments, it will be appreciated that many variations, modifications and other applications of the invention may be made.

What is claimed is:

1. An automatic aircraft landing system for automatically landing an aircraft on a runway, the system comprising:
   (a) data acquisition apparatus (DAA) including means for acquiring flight data pertaining to the descent of an aircraft along a flight path defined between a final capture point and a touchdown point on the runway; and
   (b) a controller responsive to the flight data for providing control signals to at least one of the aircraft's primary controls for urging the aircraft to essentially adhere to a guide path along at least an upper portion of its flight path
   wherein
   said controller is a fuzzy logic controller (FLC) including a rule base of production rules for processing the flight data, said FLC adapted to achieve two or more different sets of flight guidelines each respectively operative singly or in combination at different altitudes.

2. The system according to claim 1 wherein said FLC is adapted to achieve a first set of flight guidelines predominantly during an upper flight region including said final capture point, a second set of flight guidelines predominantly during an intermediate flight region and a third set of flight guidelines predominantly during a lower flight region including said touchdown point, said intermediate flight region merging at its higher and lower altitudes respectively with said upper and lower flight regions.

3. The system according to claim 2 wherein said first set of flight guidelines includes:
   i) ensure that an aircraft does not stall in mid-flight;
   ii) ensure that the vertical deviation (Z) between an aircraft's instantaneous position and the guide path and its derivative ($\Delta$Z) tend to zero for urging the aircraft to coincide with the guide path in the vertical plane; and
   iii) ensure that the horizontal deviation (Y) between an aircraft's instantaneous position and the guide path and its derivative ($\Delta$Y) tend to zero for urging the aircraft to coincide with the guide path in the horizontal plane.

4. The system according to claim 2 wherein said second set of flight guidelines includes:
   i) ensure that an aircraft does not stall mid-flight;
   ii) ensure that the vertical deviation (Z) between an aircraft's instantaneous position and the guide path and its derivative ($\Delta$Z) tend to zero whilst constraining the sink rate of the aircraft to a predetermined upper limit, thereby urging the aircraft to coincide with a modified guide path in the vertical plane; and
   iii) ensure that the horizontal deviation (Y) between an aircraft's instantaneous position and the guide path and its derivative ($\Delta$Y) tend to zero for urging the aircraft to coincide with the guide path in the horizontal plane.

5. The system according to claim 2 wherein said third set of flight guidelines includes:
   i) ensure that the sink rate of an aircraft is near zero whilst ensuring a minimum controlled forward velocity such that it does not stall midflight;
   ii) ensure that an aircraft has a positive pitch angle for a smooth landing on its rear landing gear;
   iii) ensure that the yaw angle of an aircraft tends to zero such that the aircraft does not run off the side of the runway; and
   iv) ensure that the roll angle of an aircraft tends to zero such that the tips of the wings of the aircraft do not engage the runway.

6. The system according to claim 2 wherein said FLC applies the following flight objective after touchdown on the runway: ensure that the yaw angle of the aircraft remains substantially zero such that the aircraft runs parallel to the runway midline.

7. The system according to claim 1 wherein said DAA includes:
   (a) a camera having a field of view which is substantially directed toward an incoming aircraft;
   (b) a monitor for displaying at least a portion of said field of view, said monitor including a cursor;
   (c) means for manually tracking the aircraft with said cursor; and
   (d) means for manually adjusting the size of said cursor such that said cursor substantially encompasses the image of the aircraft on said monitor.

8. The system according to claim 7 wherein said camera is mounted at a height substantially corresponding to a cross over height between said intermediate region and said lower flight region.

9. The system according to claim 7 wherein the center line of sight of said camera coincides with the runway midline.

10. An automatic aircraft landing method for automatically landing an aircraft on a runway, the method comprising the steps of:
    (a) capturing an aircraft at a final capture point;
    (b) acquiring flight data pertaining to the descent of an aircraft along a flight path defined between the final capture point and a touchdown point on the runway;
    (c) fuzzy-logic-processing the flight data through an FLC rule base according to two or more sets of flight guidelines to provide control signals, each respectively operative singly or in combination at different altitudes, to at least one of the aircraft's primary controls for urging the aircraft to essentially adhere to a guide path along at least an upper portion of its flight path; and
    (d) operating the aircraft's primary controls in accordance with the control signals to land the aircraft on the runway,
    wherein
    the step (c) includes fuzzy logic processing of the flight data by means of fuzzy logic controller including a rule base of production rules so as to achieve two or more different sets of flight guidelines each respectively operative singly or in combination at different altitudes.

11. The method according to claim 10 wherein the step of fuzzy logic processing is adapted to achieve a first set of flight guidelines predominantly during an upper flight region including said final capture point, a second set of flight guidelines predominantly during an intermediate flight region and a third set of flight guidelines predominantly during a lower flight region including said touchdown point, the intermediate flight region merging at its higher and lower altitudes respectively with the upper and lower flight regions.

12. The method according to claim 11 wherein the step of fuzzy logic processing is adapted to achieve the following first set of flight guidelines:

i) ensure that an aircraft does not stall in mid-flight;

ii) ensure that the vertical deviation (Z) between an aircraft's instantaneous position and the guide path and its derivative ($\Delta Z$) tend to zero for urging the aircraft to coincide with the guide path in the vertical plane; and iii) ensure that the horizontal deviation (Y) between an aircraft's instantaneous position and the guide path and its derivative ($\Delta Y$) tend to zero for urging the aircraft to coincide with the guide path in the horizontal plane.

13. The method according to claim 12, wherein said step of acquiring flight data includes:

(a) manually tracking an incoming aircraft on a monitor with a cursor, and (b) manually adjusting the size of the cursor such that the cursor substantially encompasses the image of the aircraft on the monitor.

14. The method according to claim 11 wherein the step of fuzzy logic processing is adapted to achieve the following second set of flight guidelines:

i) ensure that an aircraft does not stall mid-flight;

ii) ensure that the vertical deviation (Z) between an aircraft's instantaneous position and the guide path and its derivative ($\Delta Z$) tend to zero whilst constraining the sink rate of the aircraft to a predetermined upper limit, thereby urging the aircraft to coincide with a modified guide path in the vertical plane; and iii) ensure that the horizontal deviation (Y) between an aircraft's instantaneous position and the guide path and its derivative ($\Delta Y$) tend to zero for urging the aircraft to coincide with the guide path in the horizontal plane.

15. The method according to claim 14, wherein said step of acquiring flight data includes:

(a) manually tracking an incoming aircraft on a monitor with a cursor, and (b) manually adjusting the size of the cursor such that the cursor substantially encompasses the image of the aircraft on the monitor.

16. The method according to claim 11 wherein the step of fuzzy logic processing is adapted to achieve the following third set of flight guidelines:

i) ensure that the sink rate of the aircraft is near zero whilst ensuring a minimum controlled forward velocity such that the aircraft does not stall midflight;

ii) ensure that the aircraft has a positive pitch angle for a smooth landing on its rear landing gear;

iii) ensure that the yaw angle of the aircraft tends to zero such that the aircraft does not run off the side of the runway; and iv) ensure that the roll angle of the aircraft tends to zero such that the tips of the wings of the aircraft do not engage the runway.

17. The method according to claim 16, wherein said step of acquiring flight data includes:

(a) manually tracking an incoming aircraft on a monitor with a cursor, and (b) manually adjusting the size of the cursor such that the cursor substantially encompasses the image of the aircraft on the monitor.

18. The method according to claim 11 wherein the step of fuzzy logic processing is adapted to achieve the following flight guideline after touchdown on the runway: ensure that yaw angle of the aircraft remains substantially zero such that the aircraft runs parallel to the runway midline.

19. The method according to claim 10 wherein said step of acquiring flight data includes:

(a) manually tracking an incoming aircraft on a monitor with a cursor; and (d) manually adjusting the size of the cursor such that the cursor substantially encompasses the image of the aircraft on the monitor.

20. An automatic aircraft landing system for automatically landing an aircraft on a runway, the system comprising:

(a) data acquisition apparatus for acquiring flight data pertaining to the descent of an aircraft along a flight path defined between a final capture point and a touchdown point on the runway; said apparatus being provided with means including a camera trained on said aircraft to view its descent along said flight path, to display an image of the descending aircraft, and to extract therefrom said flight data; and (b) a fuzzy logic controller responsive to the flight for providing control signals according to at least one set of flight guidelines operative at different altitudes, to at least one primary control of the aircraft for urging the aircraft to essentially adhere to a guide path along at least an upper portion of its flight path.

* * * * *